US012687626B2

(12) United States Patent
Scagnol et al.

(10) Patent No.: US 12,687,626 B2
(45) Date of Patent: Jul. 21, 2026

(54) OUT-OF-BAND KEY FOR RANGING

(71) Applicant: QUALCOMM Incorporated, San Diego, CA (US)

(72) Inventors: Mauro Scagnol, Great Cambourne (GB); Mayank Batra, Cambridge (GB); Giridhar Dhati Mandyam, San Diego, CA (US); Tarik Isani, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 18/401,232

(22) Filed: Dec. 29, 2023

(65) Prior Publication Data

US 2025/0216530 A1 Jul. 3, 2025

(51) Int. Cl.
*G01S 13/02* (2006.01)
*G01S 13/76* (2006.01)

(52) U.S. Cl.
CPC ........ *G01S 13/0209* (2013.01); *G01S 13/765* (2013.01)

(58) Field of Classification Search
None
See application file for complete search history.

(56) References Cited

U.S. PATENT DOCUMENTS

2013/0090744 A1* 4/2013 Tran ...................... H04L 12/282
700/9
2016/0302074 A1* 10/2016 Hekstra .................... H04L 9/00
2016/0360341 A1* 12/2016 Srivatsa ............ H04M 1/72412
2017/0201886 A1* 7/2017 Yang ..................... H04W 12/06
2020/0062217 A1* 2/2020 Ledvina ................ H04W 64/00

FOREIGN PATENT DOCUMENTS

WO 2023022708 A1 2/2023

OTHER PUBLICATIONS

International Search Report and Written Opinion—PCT/US2024/058410—ISA/EPO—Mar. 6, 2025.

* cited by examiner

*Primary Examiner* — Adolf Dsouza
(74) *Attorney, Agent, or Firm* — Harrity & Harrity, LLP

(57) ABSTRACT
Various embodiments pertain to wireless communication. A first device may obtain an out-of-band (OOB) key that is shared OOB with respect to a ranging session defined in-band between the first device and a second device. The first device may generate, during the ranging session using the OOB key itself or in combination with information used in-band, one or more first inputs to a first scrambling sequence used in the ranging session. The first device may transmit a first message to the second device during the ranging session using the first scrambling sequence. Additional features are also disclosed.

20 Claims, 16 Drawing Sheets

900

500

600

Unauthorized Party
710

Third device
712

Second device
708

Vehicle 702

Owner 704

First device
706

700

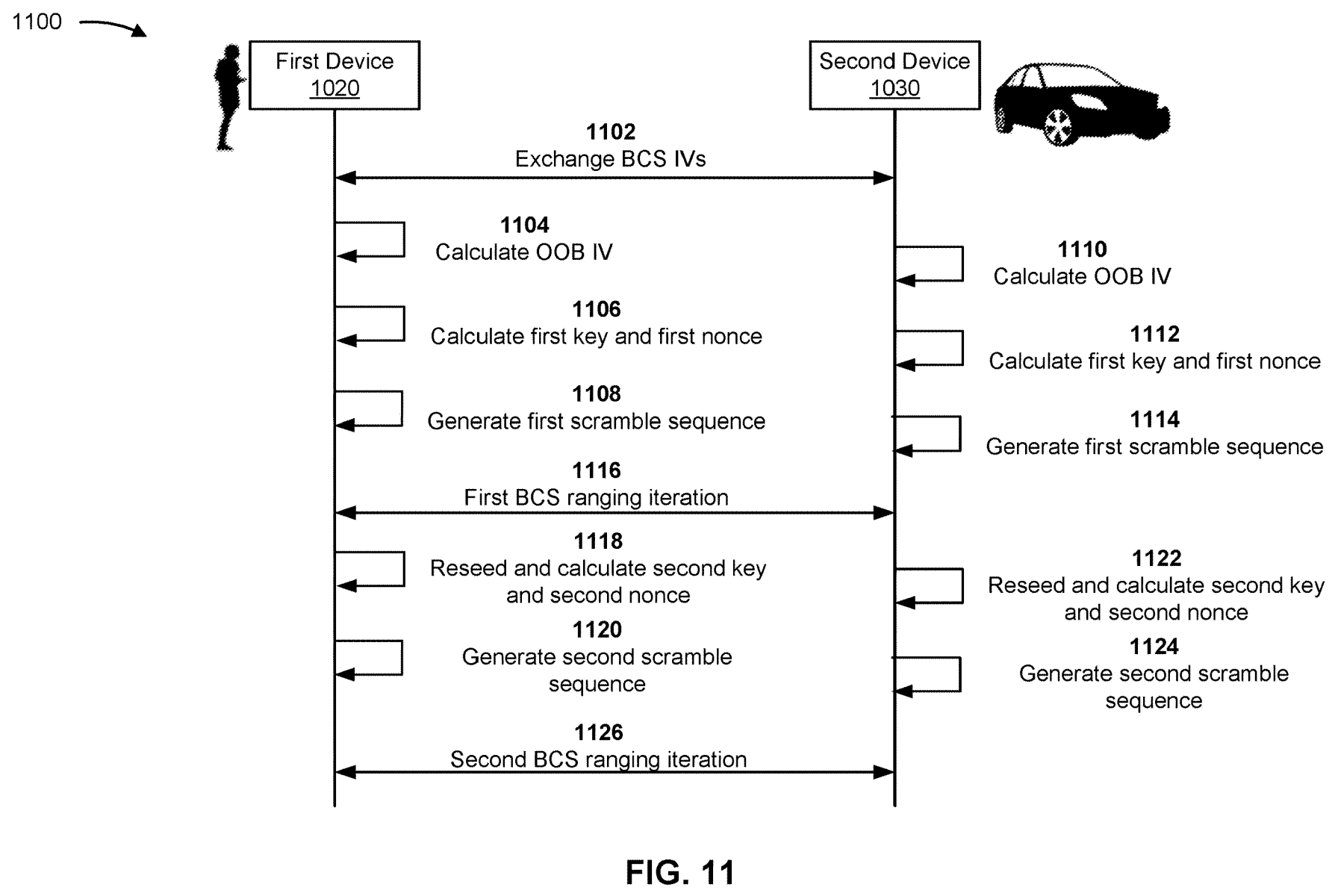

1100

First Device 1020

Second Device 1030

1102 Exchange BCS IVs

1104 Calculate OOB IV

1110 Calculate OOB IV

1106 Calculate first key and first nonce

1112 Calculate first key and first nonce

1108 Generate first scramble sequence

1114 Generate first scramble sequence

1116 First BCS ranging iteration

1118 Reseed and calculate second key and second nonce

1122 Reseed and calculate second key and second nonce

1120 Generate second scramble sequence

1124 Generate second scramble sequence

1126 Second BCS ranging iteration

FIG. 11

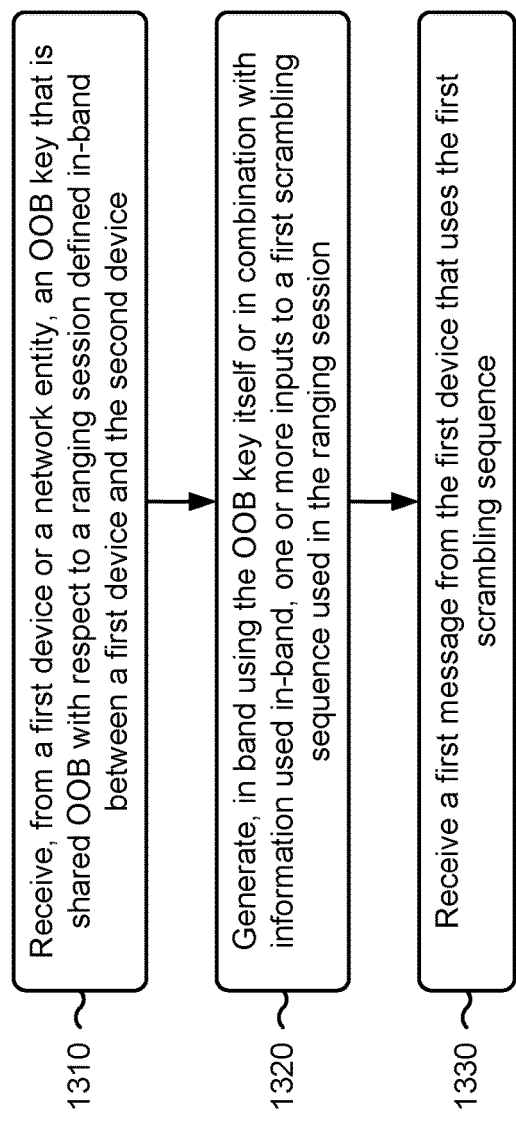

1310   Receive, from a first device or a network entity, an OOB key that is shared OOB with respect to a ranging session defined in-band between a first device and the second device 1320   Generate, in band using the OOB key itself or in combination with information used in-band, one or more inputs to a first scrambling sequence used in the ranging session 1330   Receive a first message from the first device that uses the first scrambling sequence

1410 Receive, from a first device, a request for an OOB key associated with a ranging session at the first device 1420 Transmit the OOB key to the first device OOB upon a successful attestation of the first device with the network entity 1430 Transmit the OOB key to the second device OOB upon a successful attestation of the second device with the network entity

1400

1500

Reception Component 1502

Communication Manager 1506

Transmission Component 1504

1508

OUT-OF-BAND KEY FOR RANGING

FIELD OF THE DISCLOSURE

Aspects of the present disclosure generally relate to wireless communication and specifically relate to techniques, apparatuses, and methods for out-of-band keying for a ranging session between wireless devices.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

A wireless personal area network (WPAN) is a short-range wireless network typically established by a user to interconnect various personal devices, sensors, and/or appliances located within a certain distance or area of the user. For example, a WPAN based on a communication protocol such as a Bluetooth® (BT) protocol, a Bluetooth Low Energy protocol, or a Zigbee® protocol may provide wireless connectivity to peripheral devices that are within a specific distance (e.g., 5 meters, 10 meters, 20 meters, 100 meters) of each other. Bluetooth is a short-range wireless communication protocol that supports a WPAN between a central device (such as a host device or a source device) and at least one peripheral device (such as a client device or a sink device). However, power consumption associated with Bluetooth communications that operate on a basic rate (BR) and/or enhanced data rate (EDR) physical layer may render WPAN communication impractical in certain applications.

Accordingly, to address the power consumption challenges associated with Bluetooth BR/EDR (sometimes referred to as a Bluetooth classic or Bluetooth legacy protocol), Bluetooth Low Energy (BLE) (also referred to herein as WPAN LE) was developed and adopted in various applications in which data transfers are relatively infrequent and/or to enable WPAN communication with low power consumption. For example, BLE exploits infrequent data transfer by using a low duty cycle operation and placing one or both of the central device and the peripheral device(s) into a sleep mode between data transmissions, thereby conserving power. Example applications that use BLE include battery-operated sensors and actuators in various medical, industrial, consumer, and fitness applications. BLE may be used for remotely operated locks. BLE may also be used to connect devices such as BLE-enabled smartphones, tablets, laptops, earbuds, or the like.

SUMMARY

Some aspects described herein relate to a method of wireless communication performed by a first device. The method may include obtaining an out-of-band (OOB) key that is shared OOB with respect to a ranging session defined in-band (IB) between the first device and a second device. The method may include generating, during the ranging session using the OOB key itself or in combination with information used in-band, one or more first inputs to a first scrambling sequence used in the ranging session. The method may include transmitting a first message to the second device during the ranging session using the first scrambling sequence.

Some aspects described herein relate to a method of wireless communication performed by a second device. The method may include receiving, from a first device or a network entity, an OOB key that is shared OOB with respect to a ranging session defined in-band between a first device and the second device. The method may include generating, in-band using the OOB key itself or in combination with information used in-band, one or more inputs to a first scrambling sequence used in the ranging session. The method may include receiving a first message from the first device that uses the first scrambling sequence.

Some aspects described herein relate to a method of wireless communication performed by a network entity. The method may include receiving, from a first device, a request for an OOB key associated with a ranging session at the first device. The method may include transmitting the OOB key to the first device OOB upon a successful attestation of the first device with the network entity.

Some aspects described herein relate to an apparatus for wireless communication at a first device. The apparatus may include one or more memories and one or more processors coupled to the one or more memories. The one or more processors may be individually or collectively configured to obtain an OOB key that is shared OOB with respect to a ranging session defined in-band between the first device and a second device. The one or more processors may be individually or collectively configured to generate, during the ranging session using the OOB key itself or in combination with information used in-band, one or more first inputs to a first scrambling sequence used in the ranging session. The one or more processors may be individually or collectively configured to transmit a first message to the second device during the ranging session using the first scrambling sequence.

Some aspects described herein relate to an apparatus for wireless communication at a second device. The apparatus may include one or more memories and one or more processors coupled to the one or more memories. The one or more processors may be individually or collectively configured to receive, from a first device or a network entity, an OOB key that is shared OOB with respect to a ranging session defined in-band between a first device and the second device. The one or more processors may be individually or collectively configured to generate, in-band using the OOB key itself or in combination with information used in-band, one or more inputs to a first scrambling sequence used in the ranging session. The one or more processors may be individually or collectively configured to receive a first message from the first device that uses the first scrambling sequence.

Some aspects described herein relate to an apparatus for wireless communication at a network entity. The apparatus may include one or more memories and one or more processors coupled to the one or more memories. The one or more processors may be individually or collectively configured to receive, from a first device, a request for an OOB key associated with a ranging session at the first device. The one or more processors may be individually or collectively configured to transmit the OOB key to the first device OOB upon a successful attestation of the first device with the network entity.

Some aspects described herein relate to a non-transitory computer-readable medium that stores a set of instructions for wireless communication by a first device. The set of instructions, when executed by one or more processors of the first device, may cause the first device to obtain an OOB key that is shared OOB with respect to a ranging session defined in-band between the first device and a second device. The set of instructions, when executed by one or more processors of the first device, may cause the first device to generate, during the ranging session using the OOB key itself or in combination with information used in-band, one or more first inputs to a first scrambling sequence used in the ranging session. The set of instructions, when executed by one or more processors of the first device, may cause the first device to transmit a first message to the second device during the ranging session using the first scrambling sequence.

Some aspects described herein relate to a non-transitory computer-readable medium that stores a set of instructions for wireless communication by a second device. The set of instructions, when executed by one or more processors of the second device, may cause the second device to receive, from a first device or a network entity, an OOB key that is shared OOB with respect to a ranging session defined in-band between a first device and the second device. The set of instructions, when executed by one or more processors of the second device, may cause the second device to generate, in-band using the OOB key itself or in combination with information used in-band, one or more inputs to a first scrambling sequence used in the ranging session. The set of instructions, when executed by one or more processors of the second device, may cause the second device to receive a first message from the first device that uses the first scrambling sequence.

Some aspects described herein relate to a non-transitory computer-readable medium that stores a set of instructions for wireless communication by a network entity. The set of instructions, when executed by one or more processors of the network entity, may cause the network entity to receive, from a first device, a request for an OOB key associated with a ranging session at the first device. The set of instructions, when executed by one or more processors of the network entity, may cause the network entity to transmit the OOB key to the first device OOB upon a successful attestation of the first device with the network entity.

Some aspects described herein relate to a first apparatus for wireless communication. The first apparatus may include means for obtaining an OOB key that is shared OOB with respect to a ranging session defined in-band between the first apparatus and a second apparatus. The first apparatus may include means for generating, during the ranging session using the OOB key itself or in combination with information used in-band, one or more first inputs to a first scrambling sequence used in the ranging session. The apparatus may include means for transmitting a first message to the second apparatus during the ranging session using the first scrambling sequence.

Some aspects described herein relate to a second apparatus for wireless communication. The second apparatus may include means for receiving, from a first apparatus or a network entity, an OOB key that is shared OOB with respect to a ranging session defined in-band between a first apparatus and the second apparatus. The second apparatus may include means for generating, in-band using the OOB key itself or in combination with information used in-band, one or more inputs to a first scrambling sequence used in the ranging session. The second apparatus may include means for receiving a first message from the first apparatus that uses the first scrambling sequence.

Some aspects described herein relate to an apparatus for wireless communication. The apparatus may include means for receiving, from a first device, a request for an OOB key associated with a ranging session at the first device. The apparatus may include means for transmitting the OOB key to the first device OOB upon a successful attestation of the first device with the network entity.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 11 is a diagram illustrating an example of the ranging session, in accordance with the present disclosure.

FIG. 13 is a diagram illustrating an example process performed, for example, at a second device or an apparatus of a second device, in accordance with the present disclosure.

DETAILED DESCRIPTION

Figure 1:
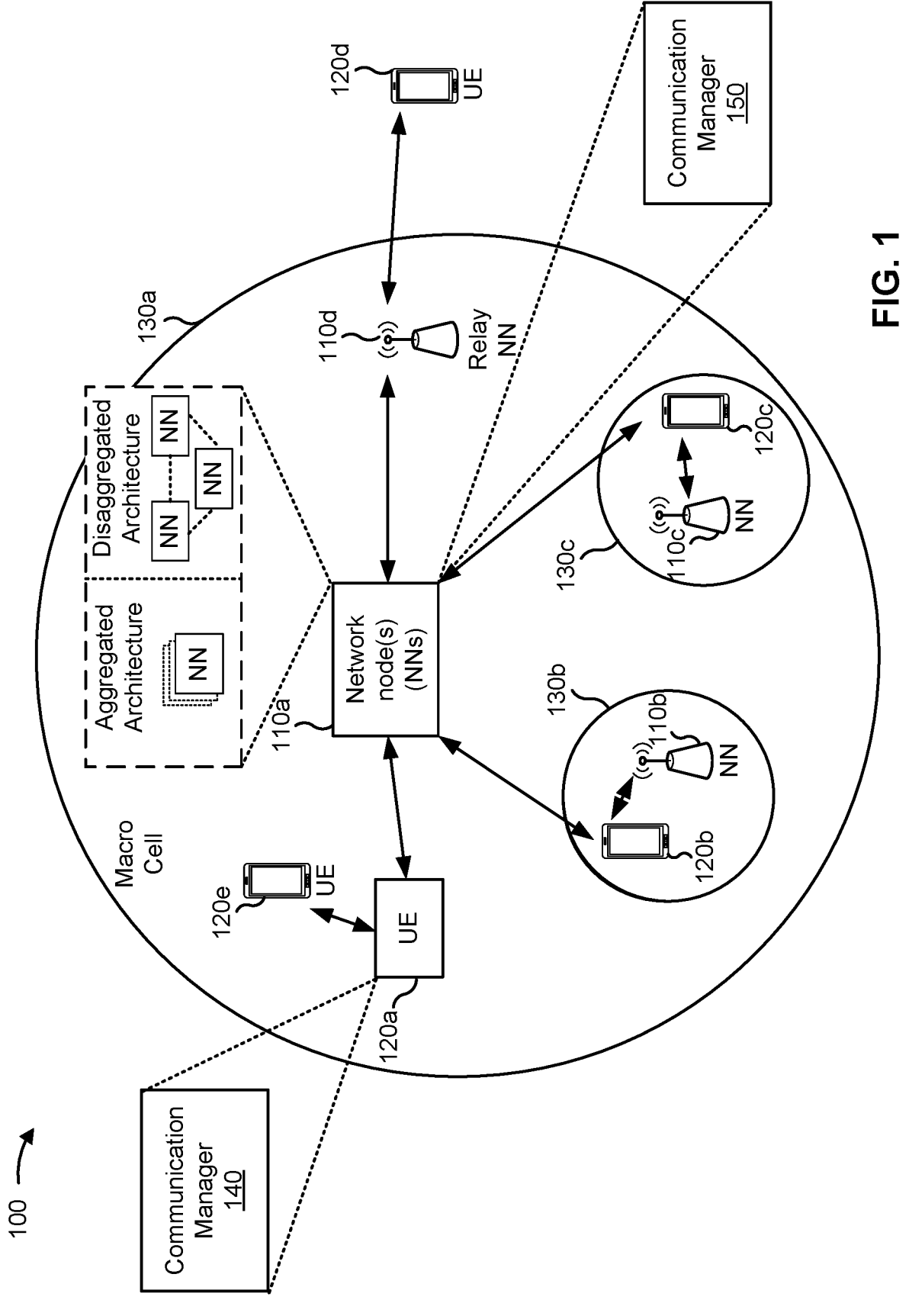
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A first device that uses low energy protocols, such as in a Bluetooth (BT) network or in a Bluetooth Low Energy (BLE) network, may transmit messages to a second device. The first device and second device may operate as part of a ranging session, where the second device may perform an action based on a range or distance between the devices.

The ranging session may include a BT channel sounding (BCS) session. BCS may involve distance estimation between the two devices, including the measuring of the propagation of a scrambled sequence. The scrambled sequence may be scrambled using a deterministic bit random generator (DRBG). The DRBG may be (re) seeded using initialization vectors (IVs) exchanged by the two devices over the Bluetooth connection. The integrity of the ranging sequence is based on the confidentiality of the IVs. The confidentiality of the IVs is based on the confidentiality of a peer-binding Long-Term Key (LTK). The LTK is exchanged in plain text over a serial connection between a host and a controller of a BLE device. Because the LTK is exchanged in plain text, an unauthorized party may obtain or derive the LTK and pretend to be an authorized receiver of the messages.

Various aspects relate generally to secure communications between two wireless devices. Some aspects more specifically relate to the two devices acquiring an out-of-band (OOB) key that is shared OOB with respect to a targeted protocol that is in-band (IB), such as a ranging session (e.g., BCS session). The two devices may use the OOB key by itself or combine the OOB key with other information shared in-band to derive inputs to a scrambling sequence. The scrambling sequence may protect a message transmitted during an iteration of the ranging session.

Particular aspects of the subject matter described in this disclosure can be implemented to realize one or more of the following potential advantages. In some examples, by using an OOB key that is obtained OOB with respect to the in-band ranging session, the two devices may provide more security to ranging messages transmitted during the ranging session. If an unauthorized party obtains some keying material exchanged over the air in-band during the ranging session, the unauthorized party will be unsuccessful in decoding the ranging messages because the unauthorized party will not have the OOB key that was shared OOB before the ranging session. Increased security conserves device resources that would be wasted or expended with a security breach.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120e.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHz), FR3 (7.125 GHz through 24.25 GHZ), FR4a or FR4-1 (52.6 GHz through 71 GHz), FR4 (52.6 GHz through 114.25 GHZ), and FR5 (114.25 GHz through 300 GHz). Although a portion of FR1 is greater than 6 GHZ, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs"). An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120a and UE 120e) may communicate directly with one another using sidelink communications (for example, without communicating by way of a network node 110 as an intermediary). As an example, the UE 120a may directly transmit data, control information, or other signaling as a sidelink communication to the UE 120e. This is in contrast to, for example, the UE 120a first transmitting data in an UL communication to a network node 110, which then transmits the data to the UE 120e in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, a first device (e.g., a UE 120) may include a communication manager 140. As described in more detail elsewhere herein, the communication manager 140 may obtain an OOB key that is shared OOB with respect to a ranging session defined in-band between the first device and a second device. The communication manager 140 may generate, during the ranging session using the OOB key itself or in combination with information used in-band, one or more first inputs to a first scrambling sequence used in the ranging session. The communication manager 140 may transmit a first message to the second device during the ranging session using the first scrambling sequence. Additionally, or alternatively, the communication manager 140 may perform one or more other operations described herein.

In some aspects, a second device (e.g., a UE 120) may include a communication manager 140. As described in more detail elsewhere herein, the communication manager 140 may receive, from a first device or a network entity, an OOB key that is shared OOB with respect to a ranging session defined in-band between a first device and the second device. The communication manager 140 may generate, in-band using the OOB key itself or in combination with information used in-band, one or more inputs to a first scrambling sequence used in the ranging session. The communication manager 140 may receive a first message from the first device that uses the first scrambling sequence. Additionally, or alternatively, the communication manager 140 may perform one or more other operations described herein. The first device and the second device may be two different UEs, such as shown in FIG. 1, or the first device and the second device may be a UE (e.g., UE 120*a*) such as in FIG. 1 and a device in a LAN such as in FIG. 4. In other terms, the second device, such as earbud 412 shown in FIG. 4, may not have WAN connectivity at all. The communication manager for receiving the OOB key may not be restricted to a WAN communication manager and may be a more general WAN or local area network communication manager.

In some aspects, a network entity (e.g., a network node 110) may include a communication manager 150. As described in more detail elsewhere herein, the communication manager 150 may receive, from a first device, a request for an OOB key associated with a ranging session at the first device. The communication manager 150 may transmit the OOB key to the first device OOB upon a successful attestation of the first device with the network entity. Additionally, or alternatively, the communication manager 150 may perform one or more other operations described herein.

As indicated above, FIG. 1 is provided as an example. Other examples may differ from what is described with regard to FIG. 1.

Figure 2:
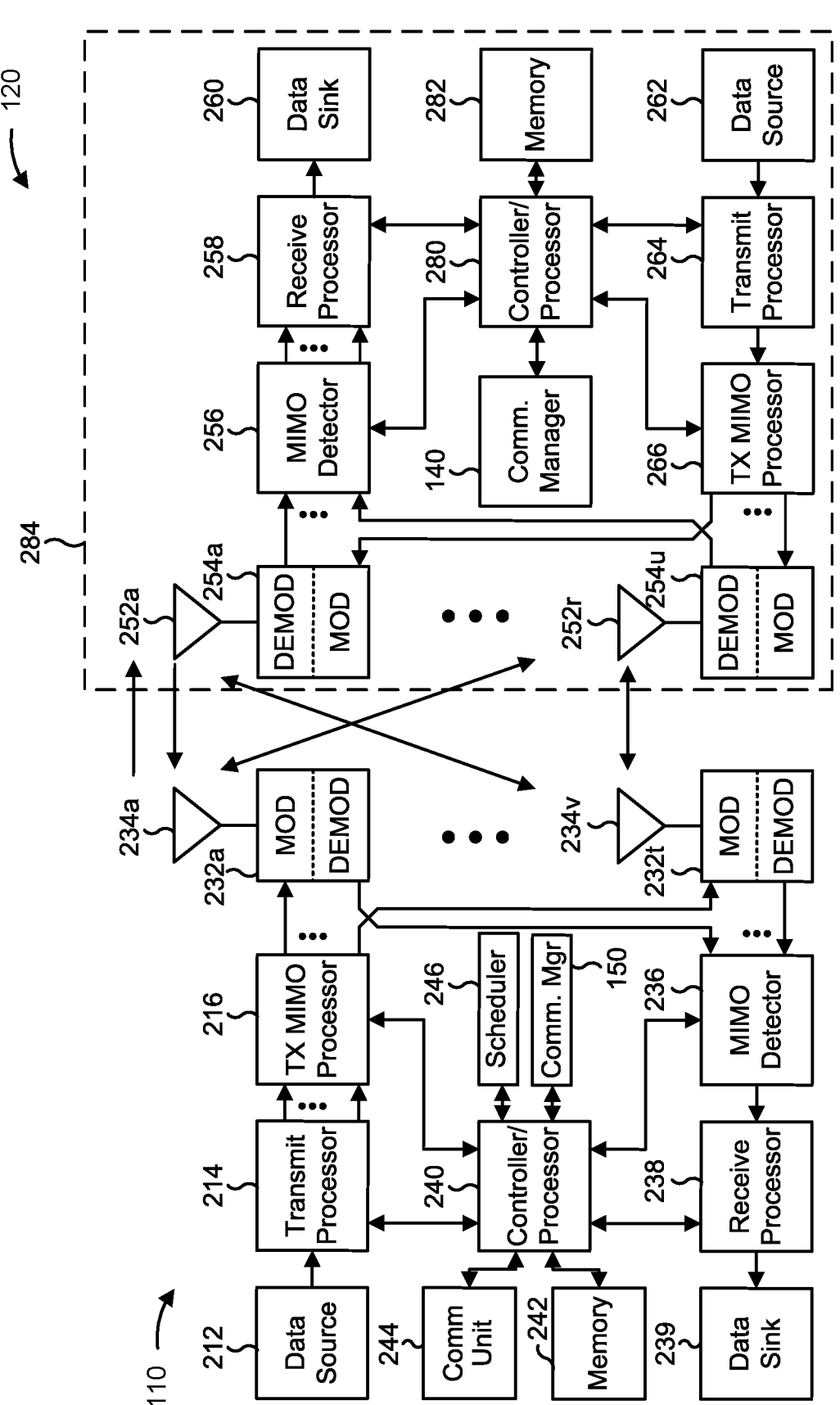
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
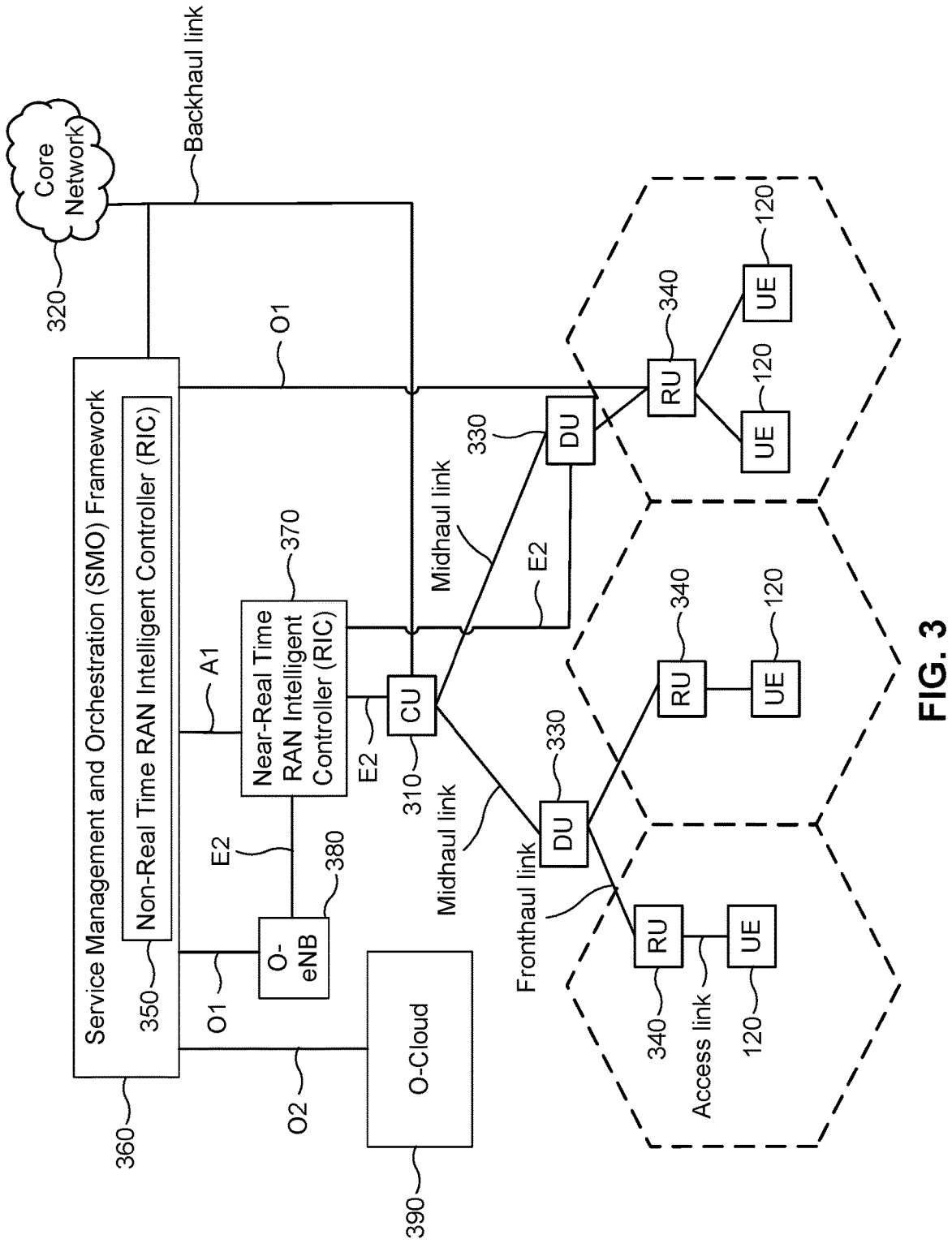
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with using an OOB key for wireless device operations, as described in more detail elsewhere herein. The first device and/or the second device described herein may include components of a UE 120, or may be a UE 120. For example, the controller/processor 240 of the network node 110, the controller/processor 280 of the UE 120, any other component(s) of FIG. 2, the CU 310, the DU 330, or the RU 340 may perform or direct operations of, for example, process 1200 of FIG. 12, process 1300 of FIG. 13, process 1400 of FIG. 14, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 1200 of FIG. 12, process 1300 of FIG. 13, process 1400 of FIG. 14, or other processes as described herein. In some examples, executing instructions may include running the instructions, converting the instructions, compiling the instructions, and/or interpreting the instructions, among other examples.

In some aspects, a first device (e.g., a UE 120) includes means for obtaining an OOB key that is shared OOB with respect to a ranging session defined in-band between the first device and a second device; means for generating, during the ranging session using the OOB key itself or in combination with information used in-band, one or more first inputs to a first scrambling sequence used in the ranging session; and/or means for transmitting a first message to the second device during the ranging session using the first scrambling sequence. In some aspects, the means for the first device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second device (e.g., a UE 120) includes means for receiving, from a first device or a network entity, an OOB key that is shared OOB with respect to a ranging session defined in-band between a first device and the second device; means for generating, in-band using the OOB key itself or in combination with information used in-band, one or more inputs to a first scrambling sequence used in the ranging session; and/or means for receiving a first message from the first device that uses the first scrambling sequence. In some aspects, the means for the second device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., a network node 110) includes means for receiving, from a first device, a request for an OOB key associated with a ranging session at the first device; and/or means for transmitting the OOB key to the first device OOB upon a successful attestation of the first device with the network entity. In some aspects, the means for the network entity to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

As indicated above, FIG. 3 is provided as an example. Other examples may differ from what is described with regard to FIG. 3.

Figure 4:
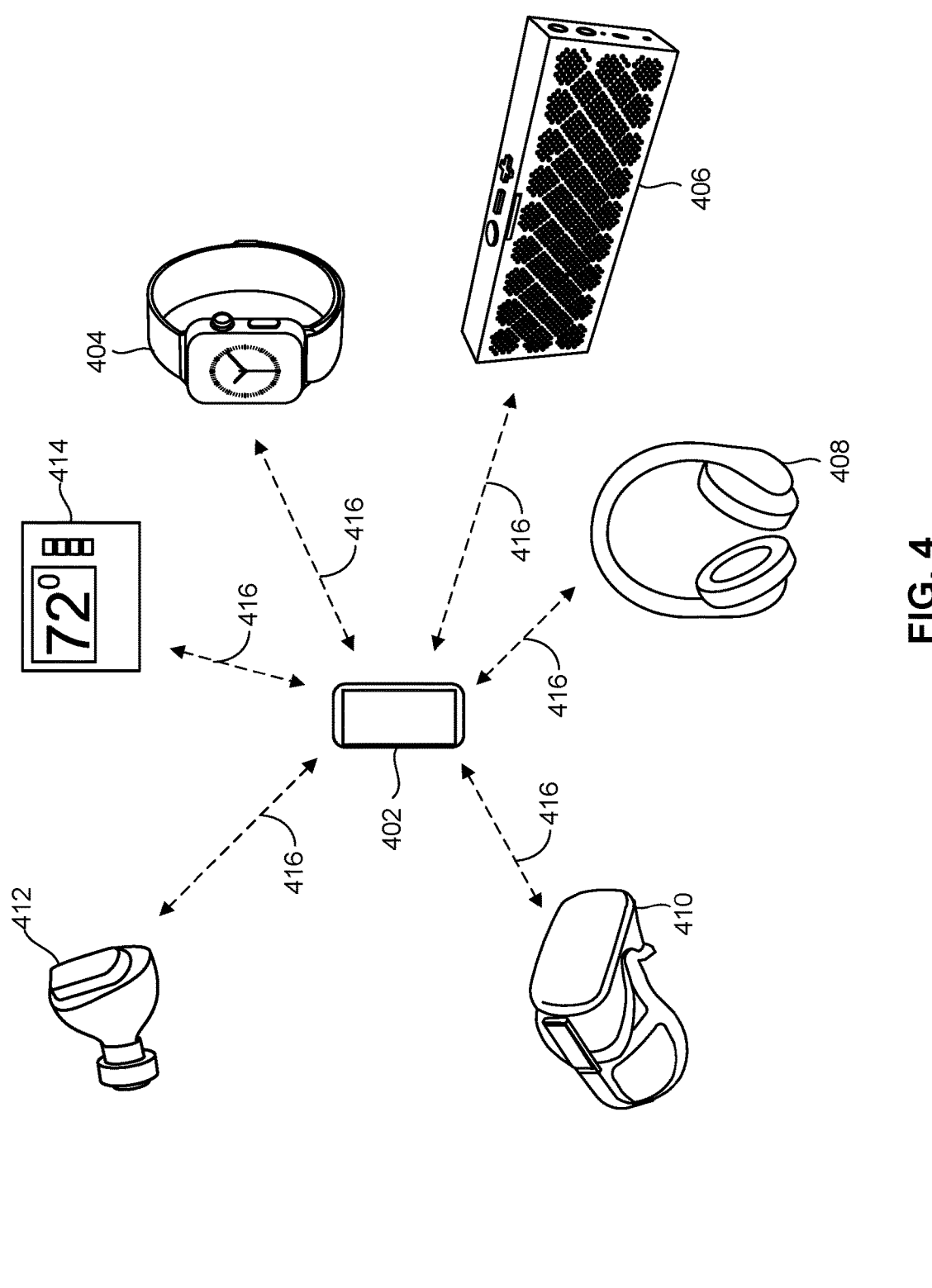
FIG. 4 is a diagram illustrating an example of a central device and peripheral devices.

FIG. 4 is a diagram illustrating an example of a first device that operates as a central device 402 and that may connect to and may establish a communication link 416 with a second device, such as a peripheral device, using a BLE protocol or a modified BLE protocol. A peripheral device may include a smartwatch 404, a BT portable speaker 406, wireless headphones 408, a headset 410, a wireless earbud 412, a smart appliance 414 (which may be referred to herein as sink devices or using other suitable terminology), and/or a locking mechanism (e.g., building door, vehicle door). The BLE protocol is part of the BT core specification and enables radio frequency communication operating within the globally accepted 2.4 GHz Industrial, Scientific, and Medical (ISM) band.

In some aspects, as described herein, the central device 402 may include the components of a UE (e.g., shown in FIG. 2) or suitable logic, circuitry, interfaces, processors, and/or code that may be used to communicate with the one or more peripheral devices 404, 406, 408, 410, 412, and/or 414 using the BLE protocol or the modified BLE protocol. In some aspects, the central device 402 may operate as an initiator to request establishment of a link layer (LL) connection with an intended peripheral device 404, 406, 408, 410, 412, and/or 414. In some aspects, a link manager may be used to control operations between a WPAN application controller in the central device 402 and a WPAN application controller in each of the intended peripheral devices 404, 406, 408, 410, 412, and/or 414.

In some aspects, after a requested LL connection is established, the central device 402 may become a primary device, and the selected or intended peripheral device 404, 406, 408, 410, 412, and/or 414 may become paired with the central device 402 over the established LL connection. As a primary device, the central device 402 may support multiple concurrent LL connections with various peripheral devices 404, 406, 408, 410, 412, and/or 414 that are operating as client devices. For example, the central device 402 may manage various aspects of data packet communication in an LL connection with one or more associated peripheral devices 404, 406, 408, 410, 412, and/or 414. For example, the central device 402 may determine an operation schedule in the LL connection with one or more peripheral devices 404, 406, 408, 410, 412, and/or 414. The central device 402 may also initiate an LL protocol data unit (PDU) exchange sequence over the LL connection. LL connections may be configured to run periodic connection events in dedicated data channels. The exchange of LL data PDU transmissions between the central device 402 and one or more of the peripheral devices 404, 406, 408, 410, 412, and/or 414 may take place within connection events.

In some aspects, the central device 402 may be configured to transmit the first LL data PDU in each connection event to an intended peripheral device 404, 406, 408, 410, 412, and/or 414. Additionally, or alternatively, in some aspects, the central device 402 may utilize a polling scheme to poll the intended peripheral device 404, 406, 408, 410, 412, and/or 414 for an LL data PDU transmission during a connection event. The intended peripheral device 404, 406, 408, 410, 412, and/or 414 may transmit an LL data PDU upon receipt of a packet carrying an LL data PDU from the central device 402. In some other aspects, a peripheral device 404, 406, 408, 410, 412, and/or 414 may transmit an LL data PDU to the central device 402 without first receiving an LL data PDU from the central device 402.

Examples of the central device 402 may include a cellular phone, a smartphone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player, a camera, a game console, a tablet, a smart device, a wearable device (such as a smart watch or wireless headphones), a vehicle, a vehicle infotainment system or car kit, a vehicle fob, an electric meter, a gas pump, a toaster, a thermostat, a hearing aid, a blood glucose on-body unit, an Internet-of-Things (IoT) device, or the like.

Examples of the one or more peripheral devices 404, 406, 408, 410, 412, and/or 414 may include a cellular phone, a smartphone, an SIP phone, an STA, a laptop, a PC, a desktop computer, a PDA, a satellite radio, a global positioning system, a multimedia device, a video device, a digital audio player, a camera, a game console, a tablet, a smart device, a wearable device (e.g., a smart watch, wireless headphones, or wireless earbuds), a vehicle, a vehicle infotainment system or car kit, a remotely operated lock, an electric meter, a gas pump, a toaster, a thermostat, a hearing aid, a blood glucose on-body unit, an IoT device, or the like. Although the central device 402 is illustrated in FIG. 4 as being in communication with six peripheral devices 404, 406, 408, 410, 412, and 414 in the WPAN 400, it will be appreciated that the central device 402 may communicate with more or fewer than six peripheral devices within the WPAN 400 without departing from the scope of the present disclosure.

In some aspects, a device implementing the BT protocol (e.g., the central device 402) may operate according to a first radio mode (e.g., a basic rate (BR)/enhanced data rate (EDR) radio mode), and a device implementing the BLE protocol may operate according to a second radio mode (e.g., the BLE radio mode). In some aspects, the central device 402 may be configured with dual radio modes, and therefore may be able to operate according to the BR/EDR mode or the BLE mode, for example, based on the type of short-range wireless communication in which the central device 402 may engage.

For example, in some aspects, the central device 402 may operate according to the BR/EDR mode for continuous streaming of data, for broadcast networks, for mesh networks, and/or for some other applications in which a relatively higher data rate may be more suitable. Additionally, or alternatively, the central device 402 may operate according to the BLE mode for short burst data transmissions, such as for some other applications in which power conservation may be desirable and/or a relatively lower data rate may be acceptable. Additionally, or alternatively, in some aspects, the central device 402 may operate according to one or more other radio modes, such as proprietary radio mode(s). Examples of other radio modes may include high speed radio modes, low energy radio modes, and/or isochronous radio modes, among other examples.

In some aspects, as described in more detail elsewhere herein, an assisting wireless device (e.g., among peripheral devices 404, 406, 408, 410, 412, and 414) may track a first retransmission metric that is based on a number of retransmitted packets that the assisting wireless device received from a source device, such as the central device 402. The assisting wireless device may receive, from a sink wireless device (e.g., among peripheral devices 404, 406, 408, 410, 412, and 414), an acknowledgement assistance request indicating a second retransmission metric for the sink wireless device. The assisting wireless device may transmit, to the sink wireless device, a response to the acknowledgement assistance request based on respective values of the first retransmission metric and the second retransmission metric. Additionally, or alternatively, the assisting wireless device may perform one or more other operations described herein.

In some aspects, as described in more detail elsewhere herein, a sink wireless device (e.g., among peripheral devices 404, 406, 408, 410, 412, and 414) may track a first retransmission metric that is based on a number of retransmitted packets that the sink wireless device received from a source device, such as the central device 402. The sink wireless device may transmit, to an assisting wireless device (e.g., among peripheral devices 404, 406, 408, 410, 412, and 414), an acknowledgement assistance request indicating the first retransmission metric tracked by the sink wireless device. The sink wireless device may receive, from the assisting wireless device, a response to the acknowledgement assistance request based on respective values of the first retransmission metric tracked by the sink wireless device and a second retransmission metric tracked by the assisting wireless device. Additionally, or alternatively, the sink wireless device may perform one or more other operations described herein.

Communication between the central device 402 and a peripheral device may take place over various short range radio technologies. For example, earbud 412 and the central device 402 may be connected over WiFi, BT/BLE, or both at the same time. The communication may involve BCS extension discovery, where discovery of a BLE extended service may occur over a WiFi protocol and not necessarily over a WAN protocol or a BT protocol.

As indicated above, FIG. 4 is provided as an example. Other examples may differ from what is described with regard to FIG. 4.

Figure 5:
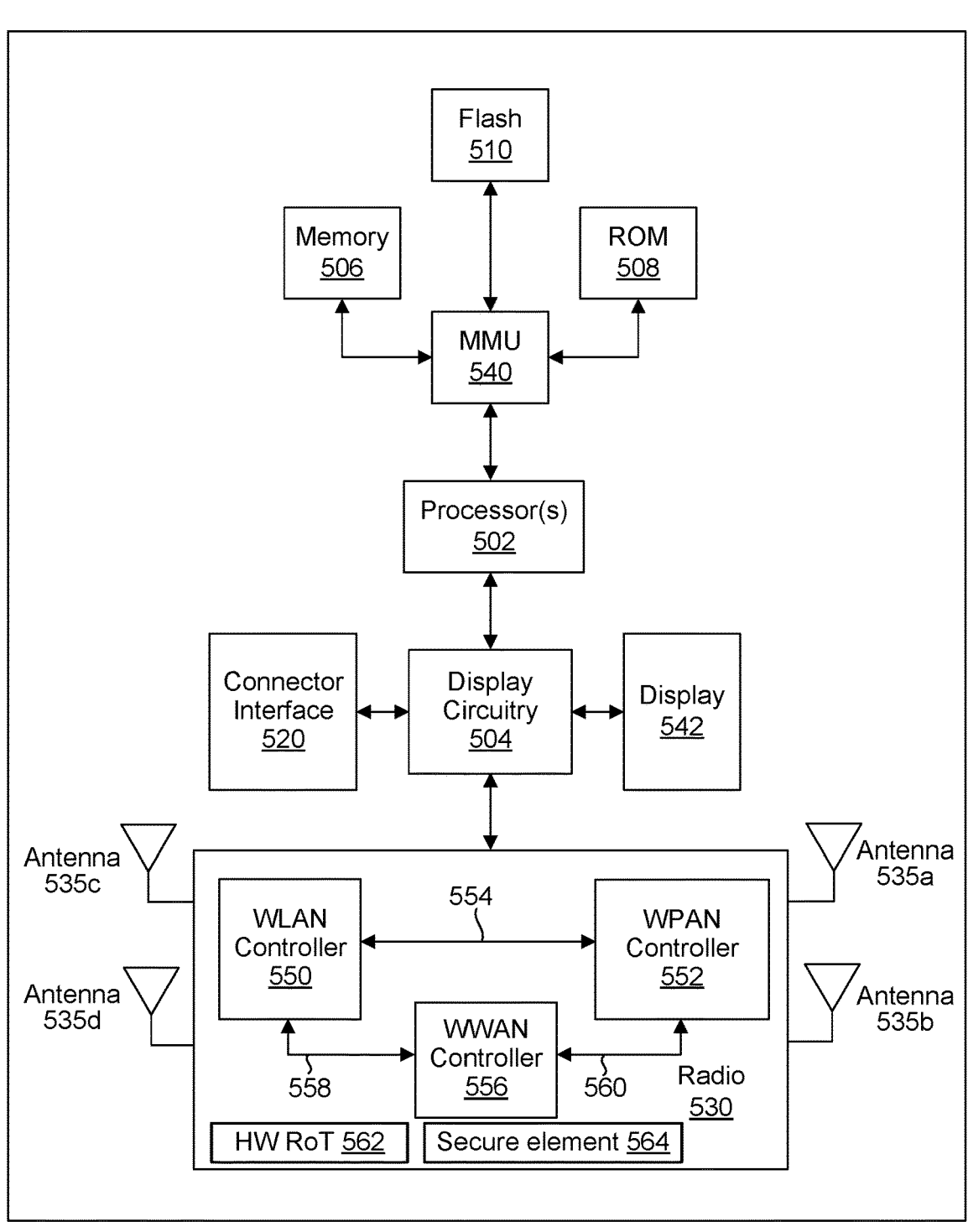
FIG. 5 is a diagram illustrating an example of a wireless communication device, in accordance with the present disclosure.

FIG. 5 is a diagram illustrating an example of a wireless communication device 500, in accordance with the present disclosure. The wireless communication device may a UE or may include components for operation with a different RAT (e.g., BLE). In some aspects, the wireless communication device 500 may be an example of the central device 402 illustrated in FIG. 4. Additionally, or alternatively, the wireless communication device 500 may be an example of one or more of the peripheral devices 404, 406, 408, 410, 412, or 414 illustrated in FIG. 4. In some aspects, the wireless communication device 500 may be a Bluetooth-enabled device (such as a BLE device).

As shown in FIG. 5, the wireless communication device 500 may include a processing element, such as processor(s) 502, which may execute program instructions for the wireless communication device 500. The wireless communication device 500 may also include a display 542 that can perform graphics processing and present information to a user. The processor(s) 502 may also be coupled to a memory management unit (MMU) 540, which may be configured to receive addresses from the processor(s) 502 and translate the addresses to address locations in memory such as memory 506, ROM 508, or flash memory 510 and/or to address locations in other circuits or devices, such as display circuitry 504, radio 530, connector interface 520, and/or display 542. The MMU 540 may also be configured to perform memory protection and page table translation or set up. In some aspects, the MMU 540 may be included as a portion of the processor(s) 502. Note that the WPAN controller 552 may be implemented in a separate chip, including its own processor 502, memory 506, ROM 508, and/or flash 510, and may be communicating with the first chip using a serial line.

The processor(s) 502 may be coupled to other circuits of the wireless communication device 500. For example, the wireless communication device 500 may include various memory types, a connector interface 520 through which the wireless communication device 500 can communicate with a computer system, and wireless communication subsystems that can transmit data to, and receive data from, other devices based on one or more wireless communication standards or protocols. For example, in some aspects, the wireless communication subsystems may include (but are not limited to) a wireless local-area network (WLAN) subsystem, a WPAN subsystem, and/or a cellular subsystem (such as a Long-Term Evolution (LTE) or New Radio (NR) subsystem). The wireless communication device 500 may include multiple antennas 535*a*, 535*b*, 535*c*, and/or 535*d* for performing wireless communication with, for example, wireless communication devices in a WPAN. In some aspects, the WPAN may be an extended PAN (XPAN).

The wireless communication device 500 may be configured to implement part or all of the techniques described herein by executing program instructions stored on a memory medium (such as a non-transitory computer-readable memory medium) and/or through hardware or firmware operation. In other embodiments, the techniques described herein may be at least partially implemented by a programmable hardware element, such as an FPGA, and/or an application specific integrated circuit (ASIC).

In some aspects, the radio 530 may include separate controllers configured to control communications for various respective RAT protocols. For example, as shown in FIG. 5, radio 530 may include a WLAN controller 550 that manages WLAN communications, a WPAN controller 552 that manages Bluetooth, BLE, and/or other suitable WPAN communications, and a wireless wide area network (WWAN) controller 556 that manages WWAN communications. In some aspects, the wireless communication device 500 may store and execute a WLAN software driver for controlling WLAN operations performed by the WLAN controller 550, a WPAN software driver for controlling WPAN operations performed by the WPAN controller 552, and/or a WWAN software driver for controlling WWAN operations performed by the WWAN controller 556.

In some aspects, a first coexistence interface 554 (such as a wired interface) may be used for sending information between the WLAN controller 550 and the WPAN controller 552. Additionally, or alternatively, in some aspects, a second coexistence interface 558 may be used for sending information between the WLAN controller 550 and the WWAN controller 556. Additionally, or alternatively, in some aspects, a third coexistence interface 560 may be used for sending information between the WPAN controller 552 and the WWAN controller 556.

In some aspects, one or more of the WLAN controller 550, the WPAN controller 552, and/or the WWAN controller 556 may be implemented as hardware, software, firmware, or any suitable combination thereof. The WPAN controller 552 may be implemented in a separate chip, including its own processor 502, memory 506, ROM 508, and/or Flash 510.

In some aspects, the WLAN controller 550 may be configured to communicate with a second device in a WPAN using a WLAN link using one or more, some, or all of the antennas 535*a*, 535*b*, 535*c*, and 535*d*. In other configurations, the WPAN controller 552 may be configured to communicate with at least one second device in a WPAN using one or more, some, or all of the antennas 535*a*, 535*b*, 535*c*, and 535*d*. In other configurations, the WWAN controller 556 may be configured to communicate with a second device in a WPAN using one or more, some, or all of the antennas 535*a*, 535*b*, 535*c*, and 535*d*. The WLAN controller 550, the WPAN controller 552, and/or the WWAN controller 556 may be configured to adjust a wakeup time interval and a shutdown time for the wireless communication device 500.

In some aspects, the wireless communication device 500 may include a hardware (HW) root of trust 562, which may include a segregated hardware subsystem of the wireless communication device 500 and may be processor-enabled. One of the main functionalities provided is key management. The wireless communication device 500 may include a secure element 564. The secure element 564 may be a secure part of the wireless communication device 500, similar to the root of trust, but at a higher security assurance level. The secure element 564 may also provide key management services.

A short-range wireless communications protocol, such as BT, BLE, and/or BR/EDR, may include and/or may use one or more other communications protocols, for example, to establish and maintain communications links. Referring also to FIG. 1, the wireless communication device 500 may establish a communications link 416 with one or more peripheral devices, such as a wireless headset 410, according to at least one communications protocol for short-range wireless communications. In some aspects, the communications link 416 may include a communications link that adheres to a protocol included and/or for use with BT, BLE, BR/EDR, or the like. In one aspect, the communications link 416 may include an asynchronous connection-oriented logical (ACL) transport, sometimes referred to as an ACL link. When operating as an ACL link, the communications link 416 may allow the central device 402 (e.g., a source device) to connect or "pair" with a peripheral device, such as the earbud 412. The connection is asynchronous in that the two devices may not need to synchronize, timewise, data communications between each other to permit communication of data packets via the communications link 416.

In some aspects, a logical link control and adaptation protocol (L2CAP) may be used within a BT protocol stack (not shown in FIG. 2 for simplicity). An L2CAP connection may be established after an ACL link has been established. Reference to L2CAP in the present disclosure may be further applicable to enhanced L2CAP (EL2CAP), which may be an enhanced version of the L2CAP protocol that enables multiplexing of multiple logical data channels via a single radio connection.

In some aspects, the communications link 416 may include an advanced audio distribution profile (A2DP) link. For example, an A2DP link may provide a point-to-point link between a source device, such as the central device 402, and a sink device, such as the earbud 412. With an A2DP link, data packets including audio may be transmitted over an ACL channel, and other information (e.g., for controlling the audio stream) may be transmitted over a separate control channel. The data packets may occur non-periodically.

In some aspects, the communications link 416 may support synchronous logical transport mechanisms between a source device (such as the central device 402) and a peripheral device (such as the earbud 412). For example, the communications link 416 may include a synchronous connection-oriented (SCO) link that provides a symmetric point-to-point link between the source device and the peripheral device using time slots reserved for BT communications. In some aspects, an SCO link may not support retransmission of data packets, which may be unsatisfactory in audio streaming and/or voice call use cases in which a dropped audio or voice packet may reduce the quality of the user experience.

In some aspects, the communications link 416 may include an extended SCO (eSCO) link. An eSCO link may provide a symmetric or asymmetric point-to-point link between a source device and a peripheral device using time slots reserved for BT communications, and may also provide for a retransmission window following the reserved time slots. Because retransmissions may be facilitated using the retransmission window, an eSCO link may be suitable for audio streaming and/or voice call use cases because a dropped audio or voice packet may be retransmitted, and therefore the probability of successfully receiving a data packet may be increased.

In some aspects, the communications link 416 shown in FIG. 4 may include an isochronous (ISO) link. When operating as an ISO link, the communications link 416 may combine some features of both synchronous and asynchronous links. For example, a stream on an ISO link may begin with a start packet, and then data packets may be asynchronously transmitted. On an ISO link, the number of retransmission attempts by a transmitting device may be limited. Thus, if a receiving device is unable to decode a data packet within the limited number of retransmission attempts, then the data packet may be dropped, and the receiving device may continue to receive the stream without data from the dropped data packet.

In some aspects, a first device (e.g., wireless communication device 500) includes means for obtaining an OOB key that is shared OOB with respect to a ranging session defined in-band between the first device and a second device; means for generating, during the ranging session using the OOB key itself or in combination with information used in-band, one or more first inputs to a first scrambling sequence used in the ranging session; and/or means for transmitting a first message to the second device during the ranging session using the first scrambling sequence. In some aspects, the means for the first device to perform operations described herein may include, for example, one or more of antennas 535a-535d, WPAN controller 552, radio 530, and/or processor 502, among other examples.

In some aspects, a second device (e.g., wireless communication device 500) includes means for receiving, from a first device or a network entity, an OOB key that is shared OOB with respect to a ranging session defined in-band between a first device and the second device; means for generating, in-band using the OOB key itself or in combination with information used in-band, one or more inputs to a first scrambling sequence used in the ranging session; and/or means for receiving a first message from the first device that uses the first scrambling sequence. In some aspects, the means for the second device to perform operations described herein may include, for example, one or more of antennas 535a-535d, WPAN controller 552, radio 530, and/or processor 502, among other examples.

As indicated above, FIG. 5 is provided as an example. Other examples may differ from what is described with regard to FIG. 5.

Figure 6:
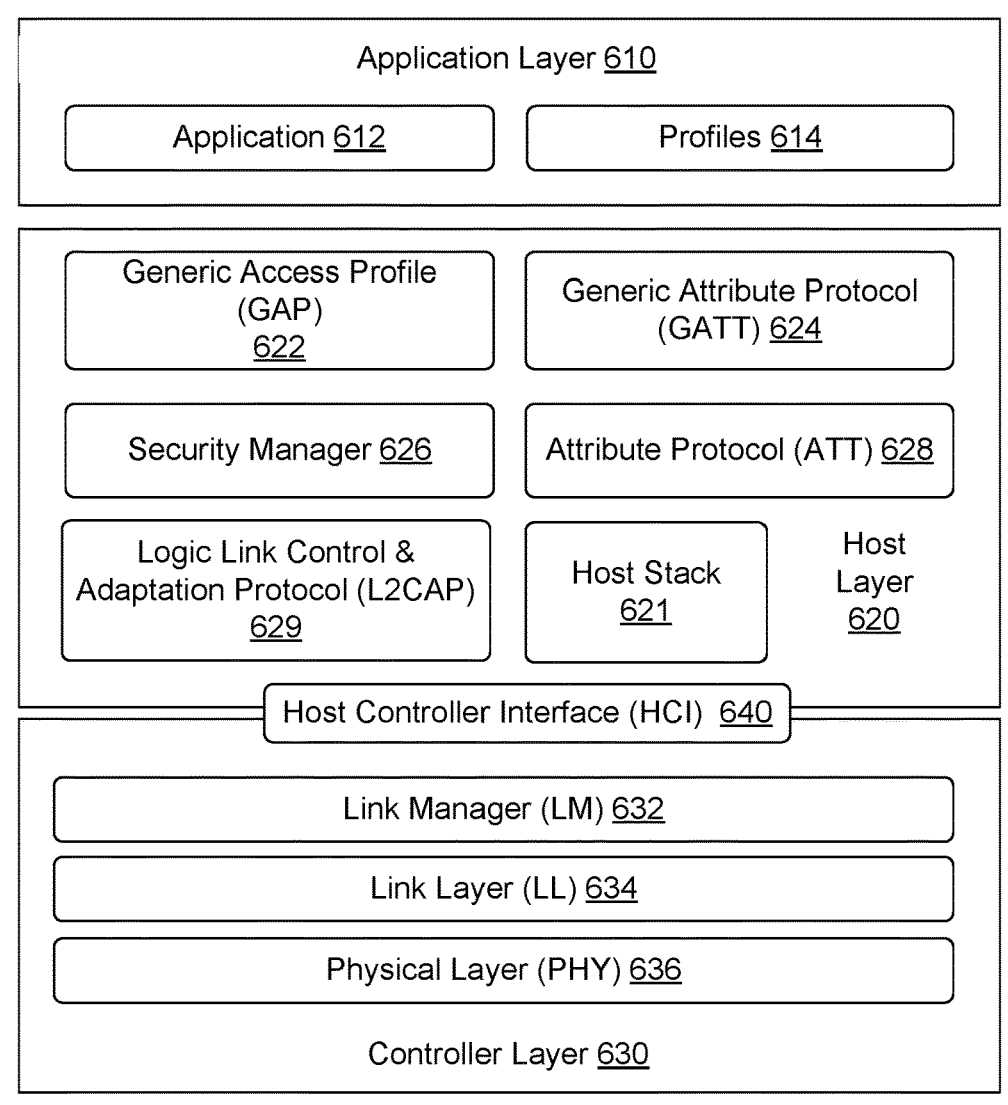
FIG. 6 is a diagram illustrating an example of a protocol stack, in accordance with the present disclosure.

FIG. 6 is a diagram illustrating an example 600 of a protocol stack (e.g., a WPAN and/or a BT protocol stack), in accordance with the present disclosure. In some aspects, the protocol stack 600 may be implemented in a wireless communication device (such as the central device 402 or one or more of the peripheral devices 404, 406, 408, 410, 412, or 414 of FIG. 4). For example, the protocol stack 600 may be implemented by one or more of processor(s) 502, memory 506, flash memory 510, ROM 508, the radio 530, and/or the WPAN controller 552 illustrated in FIG. 5. In some aspects, the protocol stack 600 may be organized into three layers that include an application layer 610, a host layer 620, and a controller layer 630.

In some aspects, the application layer 610 may be a user application layer that interfaces with the other blocks and/or layers of the protocol stack 600. In some aspects, the application layer 610 may include one or more applications 612 and one or more BT profiles 614 that allow the one or more applications 612 to use BT and/or BLE communications. The host layer 620 may include the upper layers of the protocol stack 600, and may communicate with a controller (such as the WPAN controller 552 of FIG. 5) in a wireless communication device using a host controller interface (HCI) 640. In some aspects, the host layer 620 may include a host stack 621 that can be used for application layer interface management to allow an application 612 to access WPAN communications.

The controller layer 630 may include the lower layers of the protocol stack 600. In some aspects, the controller layer 630 may be used for hardware interface management, link establishment, and link management. As shown in FIG. 6, the controller layer 630 may include a link manager (LM) 632, a link layer 634, and a PHY layer 636. The PHY layer 636 may include, for example, a radio and/or a baseband processor. In some aspects, the PHY layer 636 may define a mechanism for transmitting a bit stream over a physical link or channel that connects WPAN devices. The bit stream may be grouped into code words or symbols, and may be converted to a data packet that is transmitted over a wireless transmission medium. The PHY layer 636 may provide an electrical, mechanical, and/or procedural interface to the wireless transmission medium. The PHY layer 636 may be responsible for modulation and demodulation of data into RF signals for transmission over the air. The PHY layer 636 may describe the physical characteristics of a transmitter/ receiver (or transceiver) included in a wireless communication device. The physical characteristics may include modulation characteristics, an RF tolerance, and/or a sensitivity level, among other examples.

In some aspects, the link layer 634 is responsible for low-level communication over the PHY layer 636. The link layer 634 may manage the sequence and timing for transmitting and receiving data packets and, using an LL protocol, communicate with other devices regarding connection parameters and data flow control. The link layer 634 also provides gatekeeping functionality to limit exposure and data exchange with other devices. If filtering is configured, the link layer 634 maintains a list of allowed devices and may ignore all requests for data exchange from devices not on the list of allowed devices. The link layer 634 may also reduce power consumption. In some aspects, the link layer 634 may include a proprietary LL that may be used to discover peer devices, and establish a secure communication channel with the peer devices. In some aspects, the link layer 634 may be responsible for transporting data packets between devices in a WPAN. Each data packet may include an access address, which specifies the type of logical transport used to carry the data packet. Logical transports may exist between a master device and slave devices. Additionally, some logical transports may carry multiple logical links.

The link manager 632 may be responsible for establishing and configuring links and managing power-change requests, among other tasks. Each type of logical link, such as ACL links, A2DP links, SCO links, eSCO links, ISO links, or the like, may be associated with a specific packet type. For example, an SCO link may provide reserved channel bandwidth for communication between a central device and a peripheral device, and may support regular, periodic exchange of data packets with no retransmissions. An eSCO link may provide reserved channel bandwidth for communication between a source device and a peripheral device, and support regular, periodic exchange of data packets with retransmissions. An ACL link may exist between a source device and a peripheral device from the beginning of establishment of a connection between the source device and the peripheral device, and the data packets for ACL links may include encoding information in addition to a payload.

The link manager 632 may communicate with the host layer 620 using the HCI 340. In some aspects, the link manager 632 may translate commands associated with the HCI 640 into controller-level operations, such as baseband-level operations. The HCI 640 may act as a boundary between the lower layers (such as between the controller layer 630, the host layer 620, and the application layer 610). The BT specification may define a standard HCI to support BT systems that are implemented across two separate processors. For example, a BT system on a computer may use a processor of the BT system to implement the lower layers of the protocol stack 600, such as the PHY layer 636, the link layer 634, and/or the link manager 632, and may use a processor of a BT component to implement the other layers of the protocol stack 600, such as the host layer 620 and the application layer 610.

In FIG. 6, the host layer 620 is shown to include a generic access profile (GAP) 622, a generic attribute protocol (GATT) 624, a security manager (SM) 626, an attribute protocol (ATT) 628, and an L2CAP layer 629. The GAP 622 may provide an interface for an application 612 to initiate, establish, and manage connections with other WPAN (e.g., BT or BLE) devices. The GATT 624 may provide a service framework using the attribute protocol for discovering services, and for reading and writing characteristic values on a peer device. The GATT 624 may interface with the application 612, for example, through a profile which may define a collection of attributes and any permissions needed for the attributes to be used in BT or BLE communications.

The security manager 626 may be responsible for device pairing and key distribution. A security manager protocol implemented by the security manager 626 may define how communications with the security manager of a counterpart BLE device are performed. The security manager 626 provides additional cryptographic functions that may be used by other components of the protocol stack 600. The architecture of the security manager 626 used in WPAN communications is designed to minimize recourse requirements for peripheral devices by shifting work to a presumably more powerful central device. BLE uses a pairing mechanism for key distribution. The security manager 626 provides a mechanism to encrypt the data and a mechanism to provide data authentication.

The ATT 628 includes a client/server protocol based on attributes associated with a BLE device configured for a particular purpose. Examples may include monitoring heart rate, temperature, broadcasting advertisements, remotely operating a lock, or the like. The attributes may be discovered, read, and written by peer devices. The set of operations which are executed over the ATT 628 may include error handling, server configuration, find information, read operations, write operations, and/or queued writes. The ATT 628 may form the basis of data exchange between BT and BLE devices.

The L2CAP layer 629 may be implemented above the HCI 640, and may communicate with the controller layer 630 through the HCI 640. The L2CAP layer 629 may be responsible for establishing connections across one or more existing logical links and for requesting additional links if none exist. The L2CAP layer 629 may also implement multiplexing between different higher-layer protocols, for example, to allow different applications to use a single link, such as a logical link, including an ACL link. In some implementations, the L2CAP layer 629 may encapsulate multiple protocols from the upper layers into a data packet format (and vice versa). The L2CAP layer 629 may also break packets with a large data payload from the upper layers into multiple packets with the data payload segmented into smaller size data payloads that fit into a maximum payload size (for example, twenty-seven (27) bytes) on the transmit side.

In some standards and protocols, such as BLE and/or BR/EDR, the central device 402 may detect errors in a packet and/or a dropped/missed/not received packet through the use of cyclic redundancy check (CRC) validation and through the use of message integrity code (MIC) validation. MIC validation may be used when a packet is encrypted. For example, failure of CRC validation may indicate one or more errors in a received packet, and failure of MIC validation may indicate that another packet has not been received (although failure of CRC validation may also indicate that another packet has not been received, and/or failure of MIC validation may also indicate one or more errors in a received packet).

CRC validation and MIC validation may be based on generating CRC values and MICs, respectively, based on received packets and respectively comparing those generated CRC values and MICs to CRC values and MICs included in the received packets. Specifically, a receiving device, such as the headset 110, that receives a packet may first generate a CRC value or a CRC checksum based on the received packet, such as based on a payload and, if applicable, an MIC included in the received packet. The receiving device may compare the generated CRC value with a CRC value included in the received packet. If the generated CRC value matches the CRC value included in the received packet, then the received packet may be validated for CRC. The CRC-validated received packet may then be decrypted. However, if the generated CRC value does not match the CRC value included in the received packet, then the receiving device may determine that the received packet fails CRC validation. If the receiving device determines that the received packet fails CRC validation, then the received packet may include errors and/or may be corrupted. In one configuration, the receiving device may discard the received packet that fails CRC validation. Alternatively, in another configuration, the receiving device may attempt to recover the received packet, for example, using one or more error correction techniques.

If the received packet is encrypted and passes CRC validation, then the receiving device may decrypt the received packet to obtain a decrypted payload and a decrypted MIC. For MIC validation, the receiving device may generate an MIC based on the decrypted payload, and compare the generated MIC with the MIC obtained from the decrypted received packet. If the generated MIC matches the decrypted MIC, then the receiving device may determine that the received packet is successfully decrypted. When the received packet is successfully decrypted, the decoded and decrypted payload of the received packet may be provided to another layer of the receiving device, such as a coder-decoder (codec) of the receiving device that may cause the payload data of the received packet to be output by the receiving device, for example, as audio through speakers of the headset 112.

If the generated MIC does not match the decrypted MIC of the received packet, then the receiving device may determine that the received packet is unsuccessfully decrypted. When the received packet is unsuccessfully decrypted, then a different packet may have been missed or the received packet may be erroneous or otherwise corrupted. In one configuration, the receiving device may discard the received packet that fails MIC validation. Alternatively, in another configuration, the receiving device may attempt to recover the received packet.

As indicated above, FIG. 6 is provided as an example. Other examples may differ from what is described with regard to FIG. 6.

Figure 7:
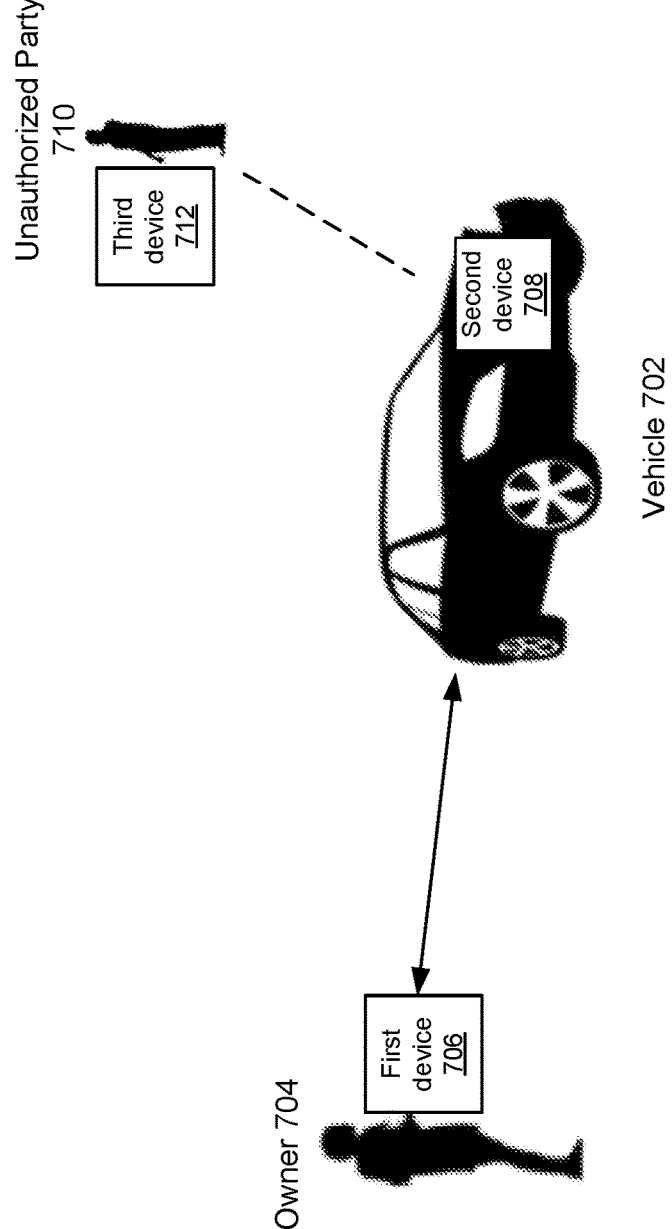
FIG. 7 is a diagram illustrating an example of accessing a vehicle remotely, in accordance with the present disclosure.

FIG. 7 is a diagram illustrating an example 700 of accessing a vehicle remotely, in accordance with the present disclosure.

Two devices may exchange messages in a ranging session. The ranging session may involve the two devices determining a distance between each other and performing an action based on the distance meeting a threshold. The two devices may use channel sounding (CS) to accurately determine the distance. CS is more accurate than using only signal strength (e.g., RSSI) measurements. CS uses additional information such as the angle of arrival, the angle of departure, phase data, and/or antenna attributes.

CS may be used in various operations. One operation may involve the security of a locking mechanism, such as a door lock of a vehicle. Example 700 shows a vehicle 702 that may be locked by an owner 704. The vehicle 702 may have an operating system (OS) that hosts applications and functionality of the vehicle 702. Upon the owner 704 turning off, leaving, and locking the vehicle 702, the OS may enter a low power mode. The low power mode may operate with less power than a power mode when the OS is fully active and/or may operate below a threshold power level. In some scenarios, the OS of the vehicle 702 may awaken and unlock the vehicle 702 or start the vehicle 702 via messaging that uses a short-range wireless technology, such as BT messaging, ultra-wideband (UWB) messaging, or Wi-Fi messaging. The messaging may be part of a ranging session between a first device 706 (e.g., UE 120) of the owner 704 and a second device 708 (e.g., UE 120) associated with the OS of the vehicle 702. In some aspects, the first device 706 may be a BLE central device (e.g., smartphone), and the second device 708 may be a BLE peripheral device, such as a lock for the vehicle 702. The ranging session may use channel sounding and security keys to attempt to prevent an unauthorized party 710 from unlocking the vehicle 702 using a third device 712.

As indicated above, FIG. 7 is provided as an example. Other examples may differ from what is described with regard to FIG. 7.

Figure 8:
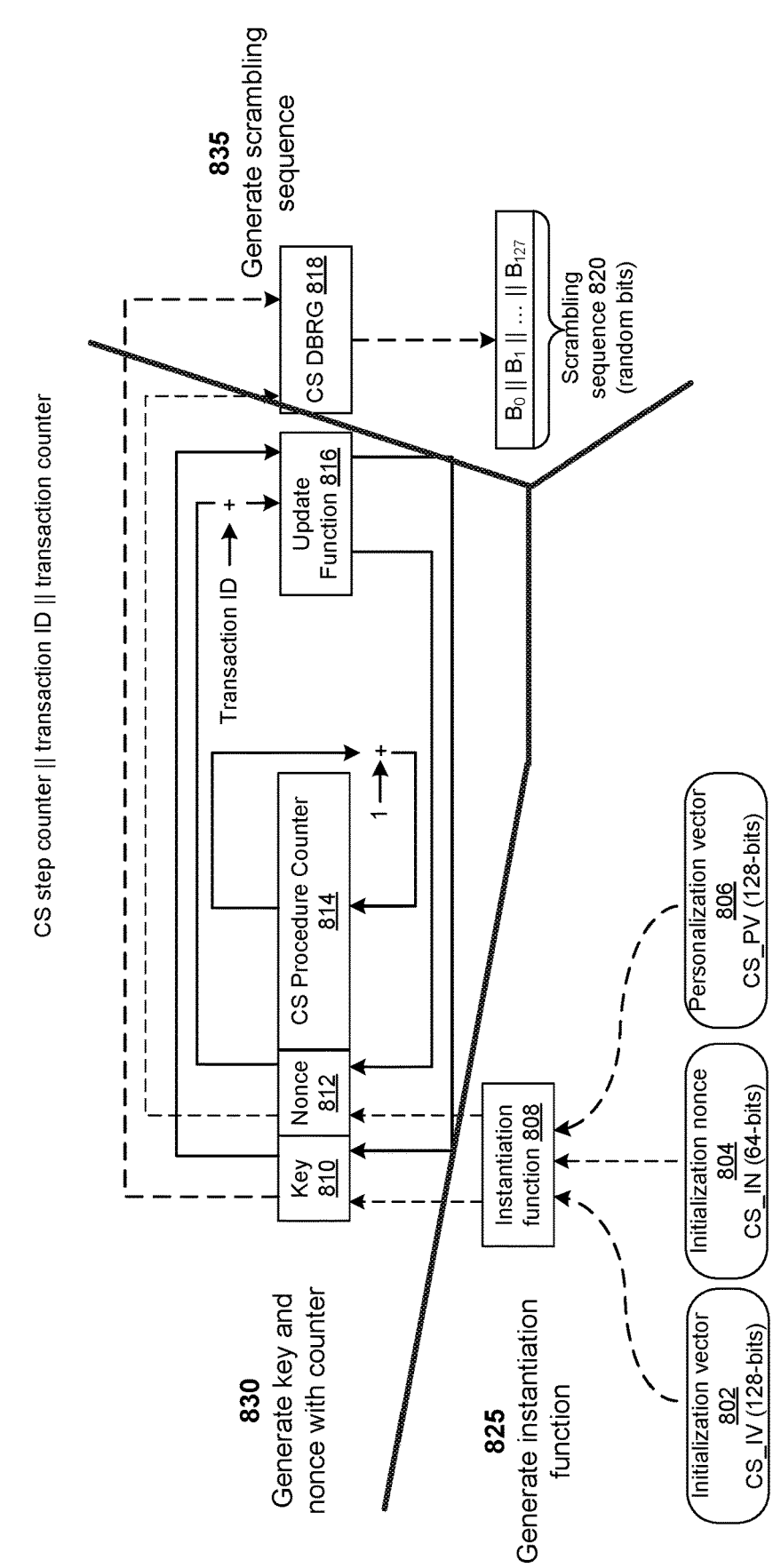
FIG. 8 is a diagram illustrating an example of preparing a channel sounding message, in accordance with the present disclosure.

FIG. 8 is a diagram illustrating an example 800 of preparing a CS message, in accordance with the present disclosure.

A ranging session may include a BT channel sounding (BCS) session. BCS may involve distance estimation between two connected devices (e.g., first device 706, second device 708), including the measuring of the propagation of a scrambled burst sequence. The scrambled sequence may be scrambled using a scrambling sequence component that may include a DRBG. The DRBG may be (re) seeded using IVs exchanged by the two devices over the Bluetooth connection. In terms of DRBG reseeding, after the IV based initialization, the ranging session key and a nonce are rotated at a low frequency (e.g., 1 Hz, 10 Hz). The integrity of the ranging sequence is based on the confidentiality of the IVs. The confidentiality of the IVs is based on the confidentiality of the peer-binding Long-Term Key (LTK). Secure storage of the LTK is outside the scope of BCS and delegated to the host. On a hosted solution, the LTK is exchanged in plain text over a serial connection.

Example 800 shows the generation, from one or more inputs, of a scrambling sequence for a ranging message at the first device 706. Using the LTK, the first device 706 and the second device 708 may share, over an encrypted link, derivation diversifiers that are pieces of information that are used to diversify the scrambled sequence. Derivation diversifiers may include initialization vectors, labels, or nonces. For example, the first device 706 and the second device 708 may share two halves of three vectors that are used to seed a key 810 and an IV (e.g., nonce 812) for the ranging session (each device contributing one half of the vector). The three vectors may be a CS initialization vector (CS_IV) 802 that is a random number, an instantiation nonce (CS_IN) 804 that is a random number, and a personalization vector (CS_PV) 806 (CS_PV_P∥CS_PV_C). Each of the CS_PV_P and CS_PV_C may be 64-bit values. The personalization vector may not be a security parameter. The intent of the personalization vector may be to introduce additional input into the DRBG instantiation function. The personalization vector may be generated from a cryptographic module or from other pseudo-random sources.

As shown by reference number 825, the first device 706 may use the three vectors as inputs to generate an instantiation function 808. As shown by reference number 830, the first device 706 may generate a key 810 and a nonce 812 from the instantiation function 808. A CS procedure counter

814 and an update function 816 may keep track of CS steps and a transaction ID for the seeding and reseeding of the key 810 and the nonce 812 for different iterations of the ranging session. As shown by reference number 835, the first device 706 may generate a scrambling sequence 820 (e.g., random bits) with a scrambling sequence generator block (e.g., CS DRBG 818) using the key 810 and the nonce 812. The first device 706 may transmit a ranging message encoded or scrambled with the scrambling sequence 820. The second device 708 may receive and decode the ranging message using the scrambling sequence that is generated at the second device 708 in the same manner as generated by the first device 706.

The security of the ranging session relies on the IV exchange secured by the LTK or another key that is exchanged in-band between a host and a controller of a device. As shown in FIG. 6, a BT/BLE device may be implemented as a host and controller set of components, and the host and controller may be communicating using the BT standard defined HCI protocol (e.g., HCI 640 in FIG. 6). The host and the controller may physically be implemented in two different chips, and the HCI protocol may be transported over a physical interface such as a serial connection. The HCI protocol does not provide confidentiality of the information transferred between the host and the controller (e.g., in no encryption between the host and the controller). The host may provide a long-term storage service for LTKs that the controller expects to use to reconnect to a paired device. The service may be provided, for example, by application 612 in FIG. 6. Upon reconnection establishment between two different BT/BLE devices, the controller on a device may request its host to provide the LTK for a given paired device and the host may retrieve it from storage and forward it over the HCI to the controller. Hence, if the two are implemented in separate chips, the LTK may be transmitted in plain text between the two chips over the serial connection. That is, messages exchanged in-band during the ranging session may use the same radio technology and the same keying material available during the ranging session. If an unauthorized party obtains the keying material in-band during the ranging session, the ranging session messages may be compromised. Compromised messages may lead to wasted resources.

As indicated above, FIG. 8 is provided as an example. Other examples may differ from what is described with regard to FIG. 8.

Figure 9:
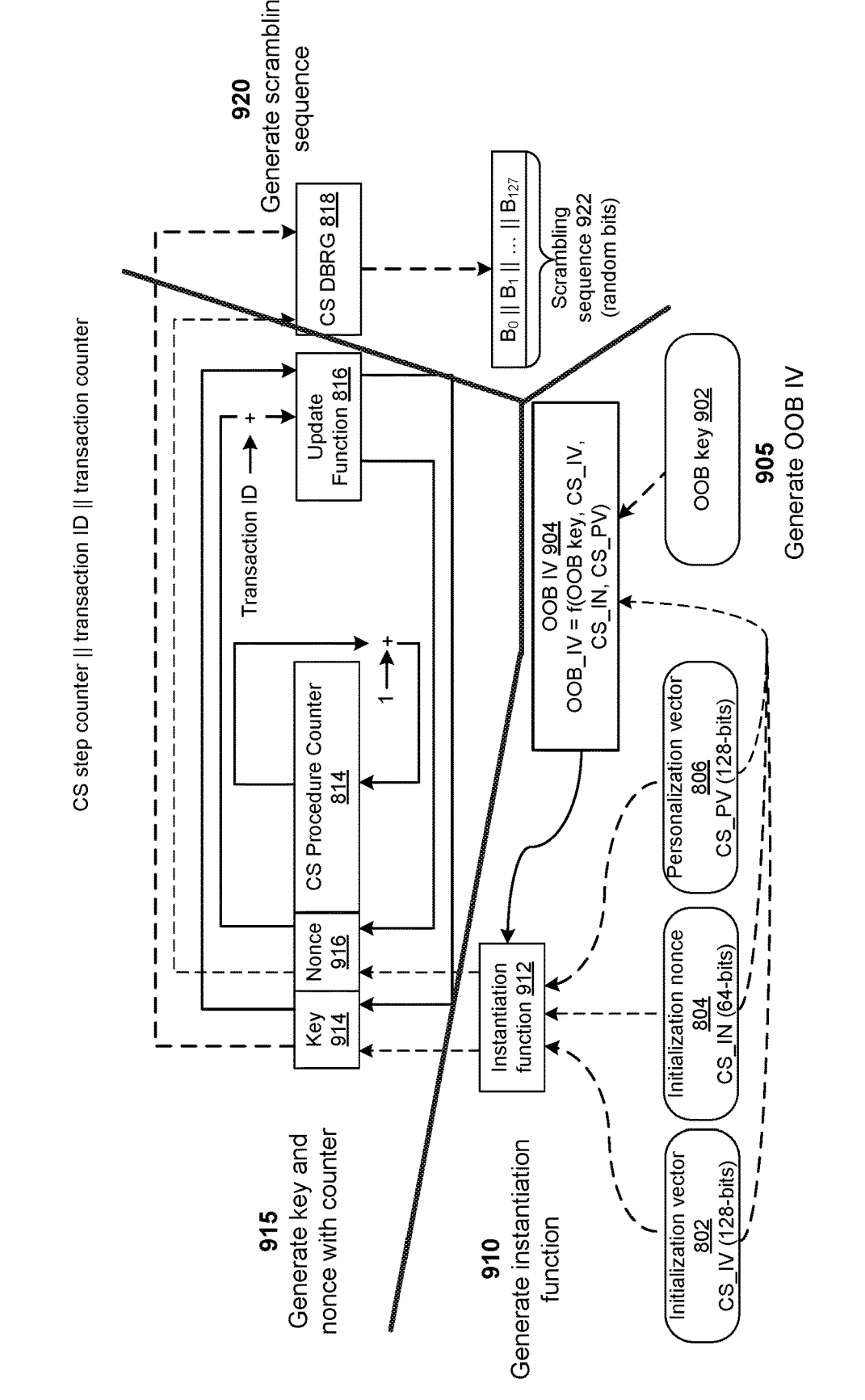
FIG. 9 is a diagram illustrating an example of using an out-of-band (OOB) key, in accordance with the present disclosure.

FIG. 9 is a diagram illustrating an example 900 of using an OOB key, in accordance with the present disclosure.

According to various aspects described herein, two devices may acquire an OOB key that is shared OOB with respect to a targeted protocol that is in-band, such as a ranging session (e.g., BCS session). The two devices may use the OOB key by itself or combine the OOB key with other information shared in-band to derive inputs to a scrambling sequence. The scrambling sequence may protect a message transmitted during an iteration of the ranging session. By using an OOB key that is obtained OOB with respect to the in-band ranging session, the two devices may provide more security to ranging messages transmitted during the ranging session. If an unauthorized party obtains some keying material exchanged over the air in-band during the ranging session, the unauthorized party will be unsuccessful in decoding the ranging messages because the unauthorized party will not have the OOB key that was shared OOB before the ranging session. Increased security conserves device resources that would be wasted or expended with a security breach.

There are various ways in which the OOB key may be shared OOB. In some aspects, an OOB key used for BT lower layers may be delivered to each device using a higher BT application layer on an end-to-end encrypted channel between the two devices. The higher layer may not rely on the same keying material used to protect the lower layers. In some aspects, the keying procedure and/or material used to obtain the OOB key may be different than the keying procedure and/or material used to secure or bind the two devices (e.g., LTK). The keying procedure and/or material used to obtain the OOB key may protect information exchanged before the ranging session starts. In some aspects, the OOB key may be obtained using a completely different RAT (e.g., WiFi protocols versus BT protocols). The keying material for the OOB key may be supported by a dedicated GATT discovery service. The discovery service may involve a different RAT (e.g., WLAN).

In some aspects, a first device (e.g., first device 706) may use the OOB key to generate a new derivation diversifier that is another input to the derivation of the key and nonce that contribute to the generation of the scrambling sequence. Example 900 shows that after establishing a ranging session, the first device 706 may use an OOB key 902 as another input to generate an OOB input, such as OOB IV 904 shown by reference number 905. The OOB IV 904 may be a function of the OOB key 902 and the other derivation diversifiers (e.g., the set of three vectors). As shown by reference number 910, the first device 706 may use the set of three vectors as inputs to generate the instantiation function 912. As shown by reference number 915, the first device 706 may generate a key 914 and a nonce 916 from the instantiation function 912. As shown by reference number 920, the first device 706 may generate a scrambling sequence 922 with the CS DRBG 818 using the key 914 and the nonce 916. The first device 706 may transmit a ranging message encoded with the scrambling sequence 922. The second device 708 may receive and decode the ranging message using a scrambling sequence that is generated in the same manner as generated by the first device 706.

In some aspects, the first device 706 may receive the OOB key 902 OOB from a network entity (e.g., edge service) that attests to the state of the first device 706 (e.g. debug closed, secure boot enabled, firmware version) or authenticates a specific instance of the first device 706 using a hardware root of trust (e.g., a segregated hardware subsystem of the device that may be processor enabled and one of whose main functionalities is to provide key management services) of the first device 706. In some aspects, the first device 706 may receive the key using a secure provisioning channel (e.g., encrypted and mutually authenticated). The secure channel may be terminated by the root of trust of the first device 706.

In some aspects, the first device 706 may be attested or authenticated using a secure element. The secure element may be a secure part of the first device 706, similar to the root of trust but at a higher security assurance level. The root of trust and/or the secure element may be associated with key management. That is, a set of derivation diversifiers may be transmitted in-band and their confidentiality during transmission may optionally rely on an LTK used to authenticate and/or protect the confidentiality of the information exchanged between the two devices. The derivation diversifiers may be used to derive new keys from root keys managed by the HW root of trust or the secure element (SE). The root keys may be device-specific, may be part of the root of trust or SE HW, may be provisioned in the HW root of trust or SE during the device manufacturing, or may be securely provisioned in the field using an end-to-end encrypted communication channel between a network entity and the HW root of trust or SE.

In some aspects, the network entity may also attest the second device 708 using a root of trust of the second device 708, a secure element of the second device 708, and/or a secure provisioning channel. In some aspects, the first device 706 and/or the second device 708 may receive the OOB key 902 via an opaque relay from another device that has a connection to the network entity.

In some aspects, the first device 706 and the second device 708 may store the OOB key 902 securely. Each device may store the OOB key 902 in a secure storage that is managed by the root of trust or a secure element.

As indicated above, FIG. 9 is provided as an example. Other examples may differ from what is described with regard to FIG. 9.

Figure 10:
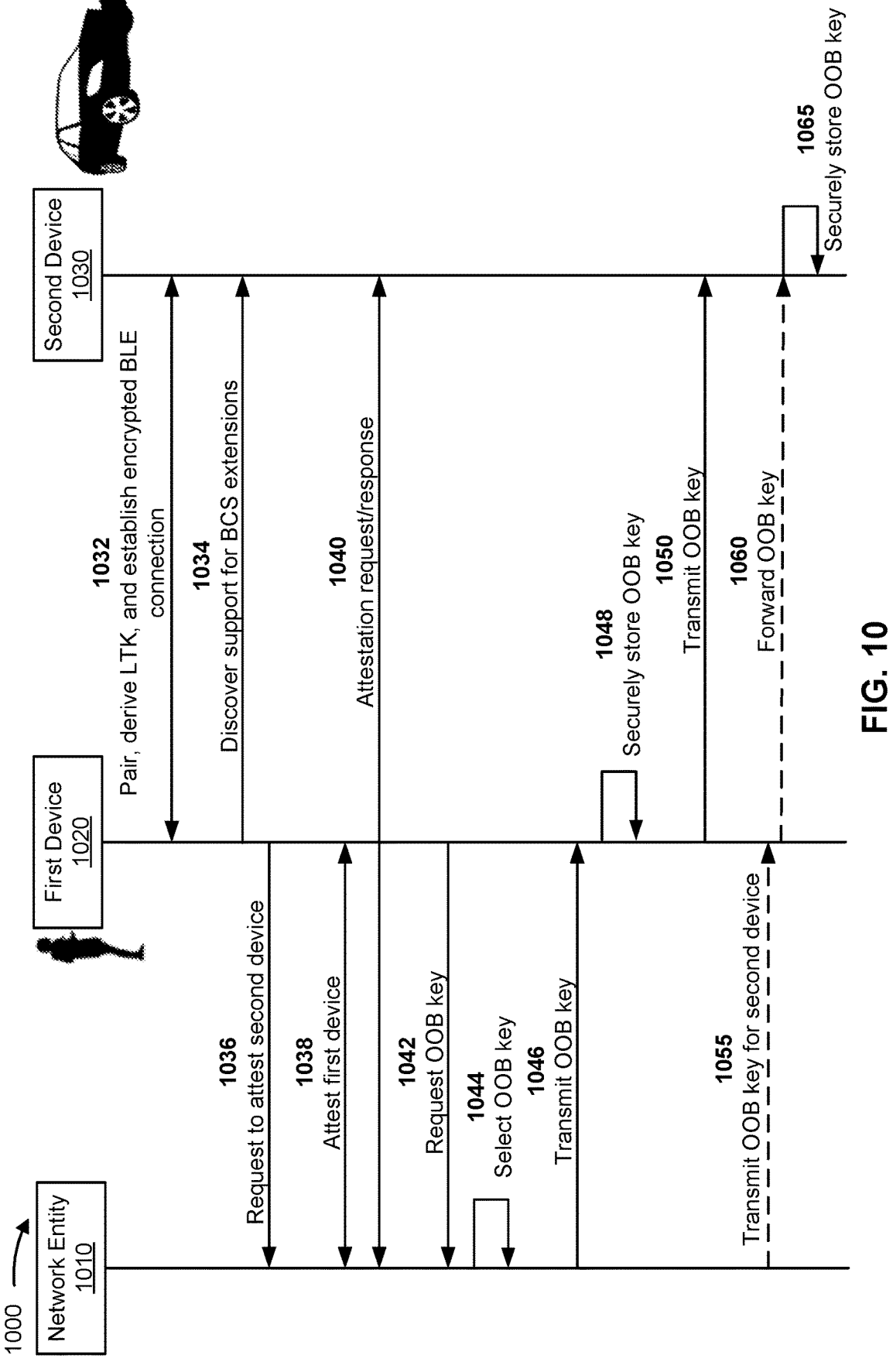
FIG. 10 is a diagram illustrating an example of sharing an OOB key OOB before a ranging session, in accordance with the present disclosure.

FIG. 10 is a diagram illustrating an example 1000 of sharing an OOB key OOB before a ranging session, in accordance with the present disclosure. A first device 1020 (e.g., UE 120, first device 706) associated with an owner of a vehicle may communicate with a second device 1030 (e.g., UE 120, second device 708) at the vehicle. The first device 1020 and/or the second device 1030 may communicate with a network entity 1010 (e.g., network node 110).

As shown by reference number 1032, the first device 1020 and the second device 1030 may pair, derive an LTK, and establish an encrypted BLE connection. As shown by reference number 1034, the first device 1020 may discover support for BCS extensions such that the first device 1020 and the second device 1030 may perform BCS during a ranging session with the added protection of an OOB key.

As shown by reference number 1036, the first device 1020 may request that the network entity 1010 attest the second device 1030. As shown by reference number 1038, the network entity 1010 may attest the first device 1020. This may be a preliminary step before attesting the second device 1030, as requested. As shown by reference number 1040, the network entity 1010 may attest the second device 1030 through a request and response transmitted directly to the second device 1030 or opaquely relayed by the first device 1020.

As shown by reference number 1042, the first device 1020 may request an OOB key. As shown by reference number 1044, the network entity 1010 may select the OOB key. As shown by reference number 1046, the network entity 1010 may transmit the OOB key. As shown by reference number 1048, the first device 1020 may securely store the OOB key. As shown by reference number 1050, the first device 1020 may transmit (or opaquely relay) the OOB key to the second device 1030. Alternatively, as shown by reference number 1055, the network entity 1010 may transmit the OOB key for the second device 1030. As shown by reference number 1060, the first device 1020 may forward the OOB key to the second device 1030. As shown by reference number 1065, the second device 1030 may securely store the OOB key.

In some aspects, the network entity 1010 may transmit the OOB key to the second device 1030. In some aspects, the network entity 1010 may transmit the OOB key to the second device 1030 via the first device 1020 or another connected device. The connected device may receive and forward the OOB key using secure key provisioning packets (e.g., the connected device is not able to access the information inside the packets).

In some aspects, neither device connects and obtains the OOB key from the network entity 1010. In this scenario, the first device 1020 may select and/or generate the OOB key and provide the OOB key to the second device 1030. The first device 1020 may use a peer-to-peer (P2P) secure communication channel that is OOB compared to the ranging session. The P2P secure communication channel may be terminated at each device by a HW root of trust or a secure element.

In some aspects, the devices may be connected to the network entity 1010 to initiate the OOB key exchange. The first device 1020 may select and/or generate the OOB key. In other scenarios, the second device 1030 may select and/or generate the OOB key. The two devices may also be considered to be a source device that provides the OOB key and a sink device that receives the OOB key. The source device may transmit, to the network entity 1010, keying material that is required to establish a secure communication channel between the two devices (secure communication channel keying material). For example, an ephemeral public key may be used in a Diffie-Hellman session establishment protocol with the other device.

The network entity 1010 may establish that there are conditions for an OOB key exchange to take place. For example, to exchange the OOB key, the network entity 1010 may attest to the state of the two devices. However, the network entity 1010 may not select the OOB key. The network entity 1010 may authorize the OOB key exchange (i.e., the exchange is not allowed to take place between the two devices unless the network entity 1010 approves). The network entity 1010 may bill for this event to occur. The network entity 1010 may sign the secure communication channel keying material from the source device and/or a source device attestation statement. The network entity 1010 may forward the optionally authorized secure communication channel keying material to the sink device. The sink device may validate the optional authorization to proceed and use the secure communication channel keying material from the source device to progress the establishment of a P2P secure communication channel. For example, the source device may select the other key set required to complete a Diffie-Helman exchange.

In some aspects, the sink device and the source device may start to exchange packets, opaquely relayed by the network entity 1010, so that the secure communication channel is established between the two devices. Over the now-established P2P secure communication channel (opaquely relayed by the network entity), the source device may forward the OOB key to the sink device.

As indicated above, FIG. 10 is provided as an example. Other examples may differ from what is described with regard to FIG. 10.

FIG. 11 is a diagram illustrating an example 1100 of the ranging session, in accordance with the present disclosure. The ranging session may be considered in-band and may be one of multiple ranging sessions that may take place after the sharing of the OOB key. The OOB key may need to be shared only once.

As shown by reference number 1102, the first device 1020 and the second device 1030 may exchange inputs in-band during the ranging session. The inputs may include BCS IVs (e.g., the set of three vectors described in connection with FIGS. 8 and 9). As shown by reference number 1104, the first device 1020 may calculate the OOB IV from the set of three vectors and the OOB key. As shown by reference number 1106, the first device 1020 may calculate a first key and a first nonce. This calculation may include generating an instantiation function from the set of three vectors and the OOB IV, and then generating the first key and the first nonce from the instantiation function using the CS procedure counter and/or the update function. As shown by reference number 1108, the first device 1020 may generate the first scramble sequence using a CS DRBG with the first key and the first nonce as inputs.

The second device 1030 may perform the same or similar actions to generate the same first scramble sequence to use for decoding ranging messages encoded with the first scramble sequence. As shown by reference number 1110, the second device may use the OOB key and the set of three vectors to calculate the OOB IV. As shown by reference number 1112, the second device 1030 may use the OOB IV and the set of three vectors to calculate the first key and the first nonce. As shown by reference number 1114, the second device 1030 may generate the first scramble sequence using the first key and the first nonce.

As shown by reference number 1116, the first device 1020 and the second device 1030 may perform a first BCS ranging iteration. This may include the first device 1020 encoding or scrambling a ranging message with the first scramble sequence and transmitting the ranging message to the second device 1030. The second device 1030 may receive the ranging message and use the first scramble sequence to decode or descramble the ranging message. The second device 1030 may determine, using BCS, a distance between the first device 1020 and the second device 1030. The second device 1030 may transmit a response message as part of the first BCS ranging iteration.

The first device 1020 may update its CS procedure and prepare to reseed the inputs to the first scramble sequence for a second BCS ranging iteration. As shown by reference number 1118, the first device 1020 may reseed and calculate a second key and a second nonce using the set of three vectors and the OOB IV. As shown by reference number 1120, the first device 1020 may generate a second scramble sequence using the second key and the second nonce. The second device 1030 may do likewise. As shown by reference number 1122, the second device 1030 may reseed and calculate the second key and the second nonce. As shown by reference number 1124, the second device 1030 may generate the second scramble sequence.

As shown by reference number 1126, the first device 1020 and the second device 1030 may use the second scramble sequence for a ranging message of the second BCS ranging iteration. The first device 1020 may be approaching the second device 1030 as the owner approaches the vehicle. The second device 1030 may determine a new distance that is shorter than a previous determined distance. If the new distance satisfies the distance threshold, the second device 1030 may cause the OS to unlock the vehicle for the owner. If the distance to the first device 1020 is not short enough, the first device 1020 and the second device 1030 may proceed with additional BCS ranging iterations as necessary to perform the secure unlocking of the vehicle.

By using an OOB key, the BCS ranging iterations may use scramble sequences that are made more secure by the OOB key. With more secure BCS ranging iterations, the ranging messages may not be spoofed and the owner may not suffer property loss or damage by an unauthorized party entering and/or stealing the vehicle. While examples 700, 800, 900, 1000, and 1100 involve using secure BCS ranging for unlocking a vehicle, an OOB key may be used for ranging discovery and other operations that are performed in-band with respect to the OOB key.

As indicated above, FIG. 11 is provided as an example. Other examples may differ from what is described with regard to FIG. 11.

Figure 12:
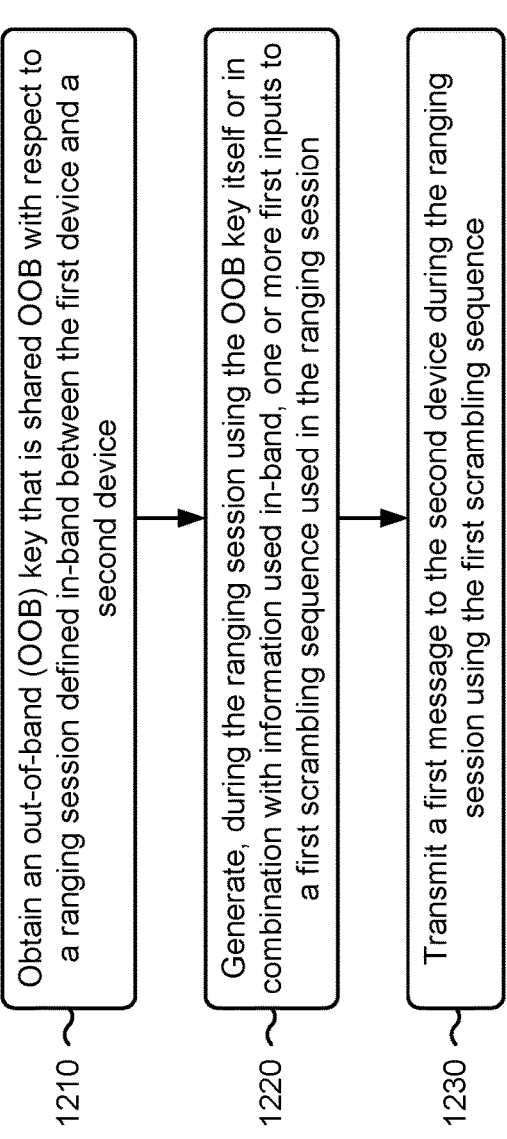
FIG. 12 is a diagram illustrating an example process performed, for example, at a first device or an apparatus of a first device, in accordance with the present disclosure.

FIG. 12 is a diagram illustrating an example process 1200 performed, for example, at a first device or an apparatus of a first device, in accordance with the present disclosure. Example process 1200 is an example where the apparatus or the first device (e.g., UE 120, first device 1020) performs operations associated with obtaining and using an OOB key for ranging.

As shown in FIG. 12, in some aspects, process 1200 may include obtaining an OOB key that is shared OOB with respect to a ranging session defined in-band between the first device and a second device (block 1210). For example, the first device (e.g., using reception component 1502 and/or communication manager 1506, depicted in FIG. 15) may obtain an OOB key that is shared OOB with respect to a ranging session defined in-band between the first device and a second device, as described above.

As further shown in FIG. 12, in some aspects, process 1200 may include generating, during the ranging session using the OOB key itself or in combination with information used in-band, one or more first inputs to a first scrambling sequence used in the ranging session (block 1220). For example, the first device (e.g., using communication manager 1506, depicted in FIG. 15) may generate, during the ranging session using the OOB key itself or in combination with information used in-band, one or more first inputs to a first scrambling sequence used in the ranging session, as described above.

As further shown in FIG. 12, in some aspects, process 1200 may include transmitting a first message to the second device during the ranging session using the first scrambling sequence (block 1230). For example, the first device (e.g., using transmission component 1504 and/or communication manager 1506, depicted in FIG. 15) may transmit a first message to the second device during the ranging session using the first scrambling sequence, as described above.

Process 1200 may include additional aspects, such as any single aspect or any combination of aspects described below and/or in connection with one or more other processes described elsewhere herein.

In a first aspect, obtaining the OOB key includes receiving the OOB key from a network entity or a peer device (e.g., another UE or wireless communication device without the help of a network entity).

In a second aspect, alone or in combination with the first aspect, process 1200 includes transmitting the OOB key to a second device OOB.

In a third aspect, alone or in combination with one or more of the first and second aspects, obtaining the OOB key includes receiving the OOB key from a network entity OOB using a communication technology that is different than a communication technology that is used in-band during the ranging session.

In a fourth aspect, alone or in combination with one or more of the first through third aspects, obtaining the OOB key includes receiving the OOB key from a network entity on a secure provisioning channel.

In a fifth aspect, alone or in combination with one or more of the first through fourth aspects, the secure provisioning channel is terminated by a root of trust of the first device that is associated with key management or terminated by a secure element of the first device having a high security assurance level.

In a sixth aspect, alone or in combination with one or more of the first through fifth aspects, process 1200 includes securely storing the OOB key at the first device prior to starting the ranging session.

In a seventh aspect, alone or in combination with one or more of the first through sixth aspects, securely storing the OOB key includes storing the OOB key at a root of trust of the first device or in a secure element of the first device.

In an eighth aspect, alone or in combination with one or more of the first through seventh aspects, the ranging session is associated with a short-range wireless protocol, and the first device is a central device and the second device is a peripheral device.

In a ninth aspect, alone or in combination with one or more of the first through eighth aspects, the ranging session is associated with a short-range wireless protocol, and the first device is a UE and the second device is associated with a locking mechanism.

In a tenth aspect, alone or in combination with one or more of the first through ninth aspects, the information used in-band includes a set of derivation diversifiers, and generating the one or more first inputs includes generating the one or more first inputs using the OOB key and the set of derivation diversifiers.

In an eleventh aspect, alone or in combination with one or more of the first through tenth aspects, the set of derivation diversifiers is associated with a long term key and includes an initialization vector, an initialization nonce, and a personalization vector.

In a twelfth aspect, alone or in combination with one or more of the first through eleventh aspects, generating the one or more first inputs includes generating an OOB IV.

In a thirteenth aspect, alone or in combination with one or more of the first through twelfth aspects, generating the one or more first inputs to the first scrambling sequence includes generating, for a first ranging iteration of the ranging session with the second device, a first key and a first nonce using the OOB IV and the set of derivation diversifiers.

In a fourteenth aspect, alone or in combination with one or more of the first through thirteenth aspects, process 1200 includes generating, for a second ranging iteration, a second key and a second nonce as second inputs to a second scrambling sequence, and transmitting, to the second device as part of the second ranging iteration, a second message using the second scrambling sequence.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, at a second device or an apparatus of a second device, in accordance with the present disclosure. Example process 1300 is an example where the apparatus or the second device (e.g., UE 120, second device 1030) performs operations associated with obtaining and using an OOB key for ranging.

As shown in FIG. 13, in some aspects, process 1300 may include receiving, from a first device or a network entity, an OOB key that is shared OOB with respect to a ranging session defined in-band between a first device and the second device (block 1310). For example, the second device (e.g., using reception component 1502 and/or communication manager 1506, depicted in FIG. 15) may receive, from a first device or a network entity, an OOB key that is shared OOB with respect to a ranging session defined in-band between a first device and the second device, as described above.

As further shown in FIG. 13, in some aspects, process 1300 may include generating, in-band using the OOB key itself or in combination with information used in-band, one or more inputs to a first scrambling sequence used in the ranging session (block 1320). For example, the second device (e.g., using communication manager 1506, depicted in FIG. 15) may generate, in-band using the OOB key itself or in combination with information used in-band, one or more inputs to a first scrambling sequence used in the ranging session, as described above.

As further shown in FIG. 13, in some aspects, process 1300 may include receiving a first message from the first device that uses the first scrambling sequence (block 1330). For example, the second device (e.g., using reception component 1502 and/or communication manager 1506, depicted in FIG. 15) may receive a first message from the first device that uses the first scrambling sequence, as described above.

Process 1300 may include additional aspects, such as any single aspect or any combination of aspects described below and/or in connection with one or more other processes described elsewhere herein.

In a first aspect, process 1300 includes decoding the first message using the first scrambling sequence.

In a second aspect, alone or in combination with the first aspect, process 1300 includes securely storing the OOB key at the second device prior to starting the ranging session.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
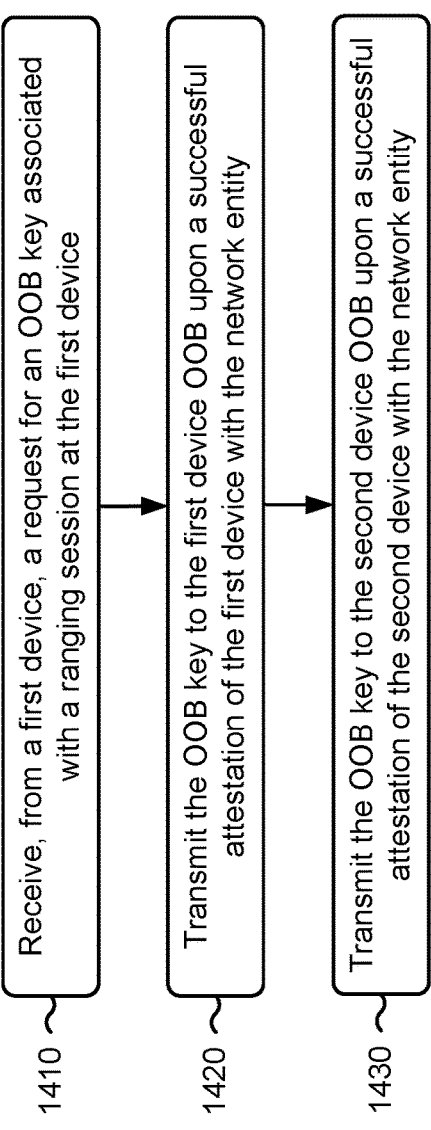
FIG. 14 is a diagram illustrating an example process performed, for example, at a network entity or an apparatus of a network entity, in accordance with the present disclosure.

FIG. 14 is a diagram illustrating an example process 1400 performed, for example, at a network entity or an apparatus of a network entity, in accordance with the present disclosure. Example process 1400 is an example where the apparatus or the network entity (e.g., network node 110, network entity 1010) performs operations associated with sharing an OOB key for ranging.

As shown in FIG. 14, in some aspects, process 1400 may include receiving, from a first device, a request for an OOB key associated with a ranging session at the first device (block 1410). For example, the network entity (e.g., using reception component 1602 and/or communication manager 1606, depicted in FIG. 16) may receive, from a first device, a request for an OOB key associated with a ranging session at the first device, as described above.

As further shown in FIG. 14, in some aspects, process 1400 may include transmitting the OOB key to the first device OOB upon a successful attestation of the first device with the network entity (block 1420). For example, the network entity (e.g., using transmission component 1604 and/or communication manager 1606, depicted in FIG. 16) may transmit the OOB key to the first device OOB upon a successful attestation of the first device with the network entity, as described above.

As further shown in FIG. 14, in some aspects, process 1400 may include transmitting the OOB key to the second device OOB upon a successful attestation of the second device with the network entity (block 1430). For example, the network entity (e.g., using transmission component 1604 and/or communication manager 1606, depicted in FIG. 16) may transmit the OOB key to the second device OOB upon a successful attestation of the second device with the network entity, as described above.

Process 1400 may include additional aspects, such as any single aspect or any combination of aspects described below and/or in connection with one or more other processes described elsewhere herein.

In a first aspect, the successful attestation of the first device, successful attestation of the second device, and/or transmission of the OOB key are associated with a root of trust of the network entity.

In a second aspect, alone or in combination with the first aspect, transmitting the OOB key includes transmitting the OOB key on a secure provisioning channel.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
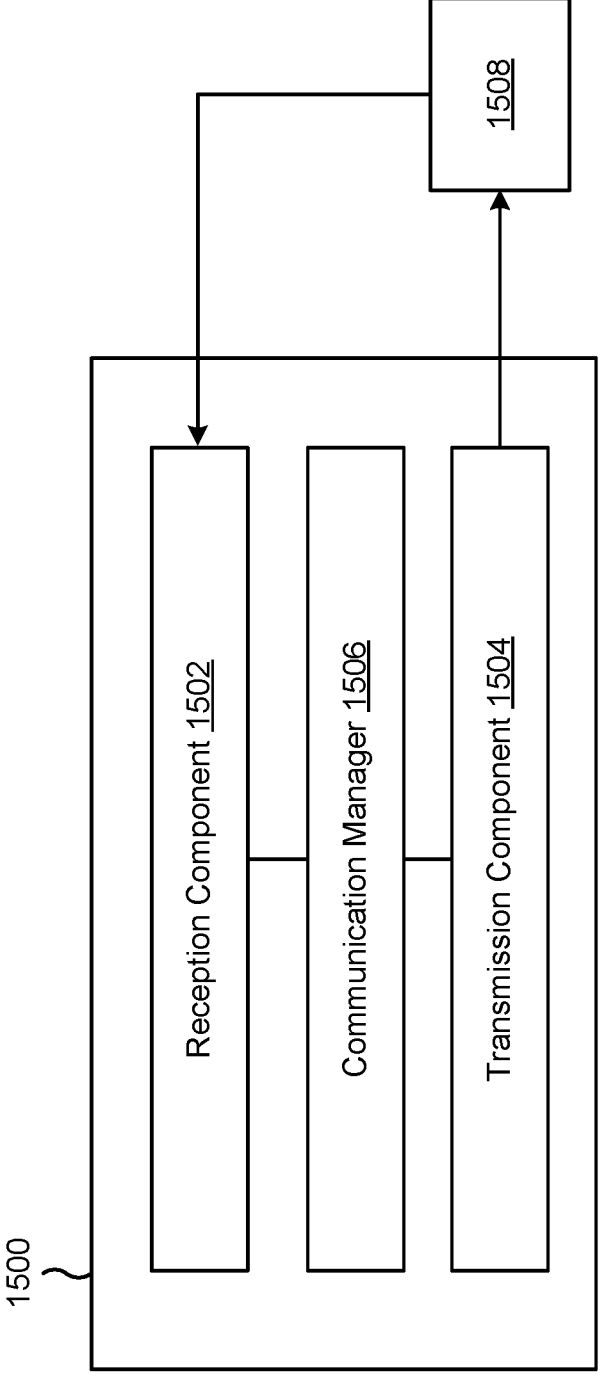
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a first device or a second device, or a first device or a second device may include the apparatus 1500. In some aspects, the apparatus 1500 includes a reception component 1502, a transmission component 1504, and/or a communication manager 1506, which may be in communication with one another (for example, via one or more buses and/or one or more other components). In some aspects, the communication manager 1506 is the communication manager 140 described in connection with FIG. 1 or the WPAN controller 552 described in connection with FIG. 5. As shown, the apparatus 1500 may communicate with another apparatus 1508, such as a UE or a network node (such as a CU, a DU, an RU, or a base station), using the reception component 1502 and the transmission component 1504.

In some aspects, the apparatus 1500 may be configured to perform one or more operations described herein in connection with FIGS. 1-11. Additionally, or alternatively, the apparatus 1500 may be configured to perform one or more processes described herein, such as process 1200 of FIG. 12, process 1300 of FIG. 13, or a combination thereof. In some aspects, the apparatus 1500 and/or one or more components shown in FIG. 15 may include one or more components of the first device described in connection with FIG. 2 or FIG. 5. Additionally, or alternatively, one or more components shown in FIG. 15 may be implemented within one or more components described in connection with FIG. 2 or FIG. 5. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1502 may receive communications, such as reference signals, control information, data communications, or a combination thereof, from the apparatus 1508. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, one or more modems, one or more demodulators, one or more MIMO detectors, one or more receive processors, one or more controllers/processors, one or more memories, or a combination thereof, of the first device described in connection with FIG. 2 or FIG. 5.

The transmission component 1504 may transmit communications, such as reference signals, control information, data communications, or a combination thereof, to the apparatus 1508. In some aspects, one or more other components of the apparatus 1500 may generate communications and may provide the generated communications to the transmission component 1504 for transmission to the apparatus 1508. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1504 may include one or more antennas, one or more modems, one or more modulators, one or more transmit MIMO processors, one or more transmit processors, one or more controllers/processors, one or more memories, or a combination thereof, of the first device described in connection with FIG. 2 or FIG. 5. In some aspects, the transmission component 1504 may be co-located with the reception component 1502 in one or more transceivers.

The communication manager 1506 may support operations of the reception component 1502 and/or the transmission component 1504. For example, the communication manager 1506 may receive information associated with configuring reception of communications by the reception component 1502 and/or transmission of communications by the transmission component 1504. Additionally, or alternatively, the communication manager 1506 may generate and/or provide control information to the reception component 1502 and/or the transmission component 1504 to control reception and/or transmission of communications.

In some aspects associated with a first device, the reception component 1502 may obtain an OOB key that is shared OOB with respect to a ranging session defined in-band between the first device and a second device. The communication manager 1506 may generate, during the ranging session using the OOB key itself or in combination with information used in-band, one or more first inputs to a first scrambling sequence used in the ranging session. The transmission component 1504 may transmit a first message to the second device during the ranging session using the first scrambling sequence.

The transmission component 1504 may transmit the OOB key to a second device OOB. The communication manager 1506 may securely store the OOB key at the first device prior to starting the ranging session. The communication manager 1506 may generate, for a second ranging iteration, a second key and a second nonce as second inputs to a second scrambling sequence. The transmission component 1504 may transmit, to the second device as part of the second ranging iteration, a second message using the second scrambling sequence.

In some aspects associated with a second device, the reception component 1502 may receive, from a first device or a network entity, an OOB key that is shared OOB with respect to a ranging session defined in-band between a first device and the second device. The communication manager 1506 may generate, in-band using the OOB key itself or in combination with information used in-band, one or more inputs to a first scrambling sequence used in the ranging session. The reception component 1502 may receive a first message from the first device that uses the first scrambling sequence.

The communication manager 1506 may decode the first message using the first scrambling sequence. The communication manager 1506 may securely store the OOB key at the second device prior to starting the ranging session.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
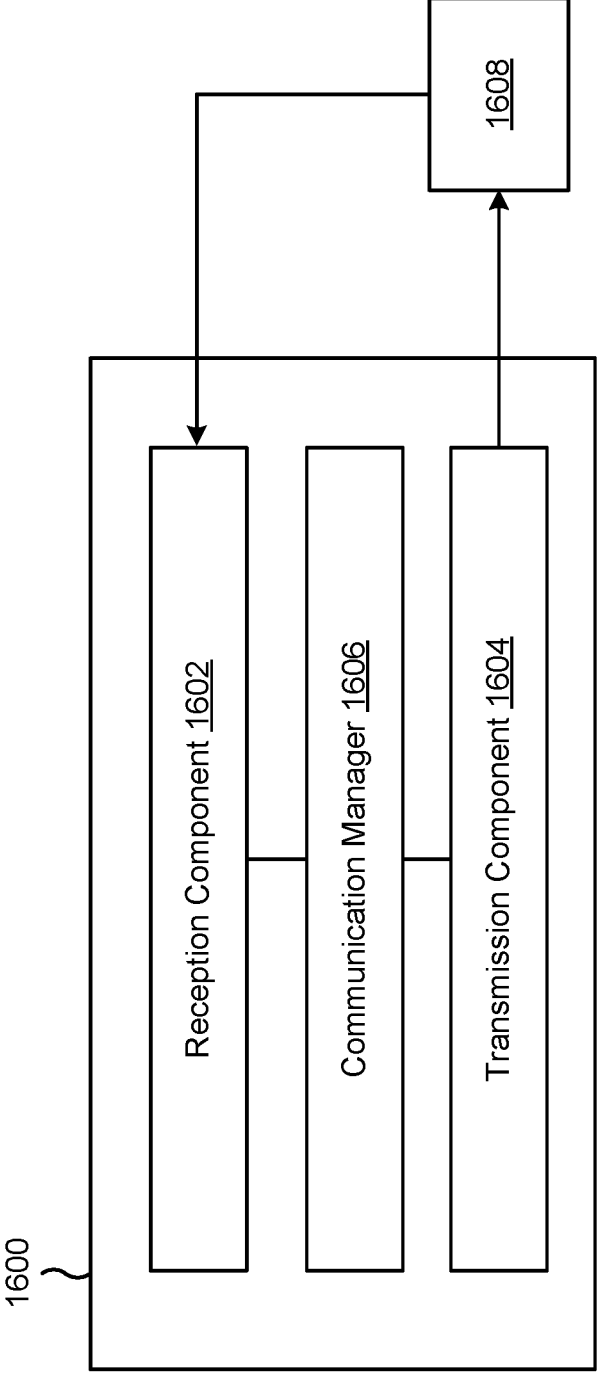
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be a network entity, or a network entity may include the apparatus 1600. In some aspects, the apparatus 1600 includes a reception component 1602, a transmission component 1604, and/or a communication manager 1606, which may be in communication with one another (for example, via one or more buses and/or one or more other components). In some aspects, the communication manager 1606 is the communication manager 150 described in connection with FIG. 1. As shown, the apparatus 1600 may communicate with another apparatus 1608, such as a UE or a network node (such as a CU, a DU, an RU, or a base station), using the reception component 1602 and the transmission component 1604.

In some aspects, the apparatus 1600 may be configured to perform one or more operations described herein in connection with FIGS. 1-11. Additionally, or alternatively, the apparatus 1600 may be configured to perform one or more processes described herein, such as process 1400 of FIG. 14. In some aspects, the apparatus 1600 and/or one or more components shown in FIG. 16 may include one or more components of the network entity described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1602 may receive communications, such as reference signals, control information, data communications, or a combination thereof, from the apparatus 1608. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, one or more modems, one or more demodulators, one or more MIMO detectors, one or more receive processors, one or more controllers/processors, one or more memories, or a combination thereof, of the network entity described in connection with FIG. 2.

The transmission component 1604 may transmit communications, such as reference signals, control information, data communications, or a combination thereof, to the apparatus 1608. In some aspects, one or more other components of the apparatus 1600 may generate communications and may provide the generated communications to the transmission component 1604 for transmission to the apparatus 1608. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1608. In some aspects, the transmission component 1604 may include one or more antennas, one or more modems, one or more modulators, one or more transmit MIMO processors, one or more transmit processors, one or more controllers/processors, one or more memories, or a combination thereof, of the network entity described in connection with FIG. 2. In some aspects, the transmission component 1604 may be co-located with the reception component 1602 in one or more transceivers.

The communication manager 1606 may support operations of the reception component 1602 and/or the transmission component 1604. For example, the communication manager 1606 may receive information associated with configuring reception of communications by the reception component 1602 and/or transmission of communications by the transmission component 1604. Additionally, or alternatively, the communication manager 1606 may generate and/or provide control information to the reception component 1602 and/or the transmission component 1604 to control reception and/or transmission of communications.

The reception component 1602 may receive, from a first device, a request for an OOB key associated with a ranging session at the first device. The transmission component 1604 may transmit the OOB key to the first device OOB upon a successful attestation of the first device with the network entity.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a first device, comprising: obtaining an out-of-band (OOB) key that is shared OOB with respect to a ranging session defined in-band between the first device and a second device; generating, during the ranging session using the OOB key itself or in combination with information used in-band, one or more first inputs to a first scrambling sequence used in the ranging session; and transmitting a first message to the second device during the ranging session using the first scrambling sequence.

Aspect 2: The method of Aspect 1, wherein obtaining the OOB key includes receiving the OOB key from a network entity or a peer device.

Aspect 3: The method of any of Aspects 1-2, further comprising transmitting the OOB key to a second device OOB.

Aspect 4: The method of any of Aspects 1-3, wherein obtaining the OOB key includes receiving the OOB key from a network entity OOB using a communication technology that is different than a communication technology that is used in-band during the ranging session.

Aspect 5: The method of any of Aspects 1-4, wherein obtaining the OOB key includes receiving the OOB key from a network entity on a secure provisioning channel.

Aspect 6: The method of Aspect 5, wherein the secure provisioning channel is terminated by a root of trust of the first device that is associated with key management or terminated by a secure element of the first device having a high security assurance level.

Aspect 7: The method of any of Aspects 1-6, further comprising securely storing the OOB key at the first device prior to starting the ranging session.

Aspect 8: The method of Aspect 7, wherein securely storing the OOB key includes storing the OOB key at a root of trust of the first device or in a secure element of the first device.

Aspect 9: The method of any of Aspects 1-8, wherein the ranging session is associated with a short-range wireless protocol, and wherein the first device is a central device and the second device is a peripheral device.

Aspect 10: The method of any of Aspects 1-9, wherein the ranging session is associated with a short-range wireless protocol, and wherein the first device is a user equipment (UE) and the second device is associated with a locking mechanism.

Aspect 11: The method of any of Aspects 1-10, wherein the information used in-band includes a set of derivation diversifiers, and wherein generating the one or more first inputs includes generating the one or more first inputs using the OOB key and the set of derivation diversifiers.

Aspect 12: The method of Aspect 11, wherein the set of derivation diversifiers is associated with a long term key and includes an initialization vector, an initialization nonce, and a personalization vector.

Aspect 13: The method of Aspect 11, wherein generating the one or more first inputs includes generating an OOB initialization vector (IV).

Aspect 14: The method of Aspect 13, wherein generating the one or more first inputs to the first scrambling sequence includes generating, for a first ranging iteration of the ranging session with the second device, a first key and a first nonce using the OOB IV and the set of derivation diversifiers.

Aspect 15: The method of Aspect 14, further comprising: generating, for a second ranging iteration, a second key and a second nonce as second inputs to a second scrambling sequence; and transmitting, to the second device as part of the second ranging iteration, a second message using the second scrambling sequence.

Aspect 16: A method of wireless communication performed by a second device, comprising: receiving, from a first device or a network entity, an out-of-band (OOB) key that is shared OOB with respect to a ranging session defined in-band between a first device and the second device; generating, in-band using the OOB key itself or in combination with information used in-band, one or more inputs to a first scrambling sequence used in the ranging session; and receiving a first message from the first device that uses the first scrambling sequence.

Aspect 17: The method of Aspect 16, further comprising decoding the first message using the first scrambling sequence.

Aspect 18: The method of any of Aspects 16-17, further comprising securely storing the OOB key at the second device prior to starting the ranging session.

Aspect 19: A method of wireless communication performed by a network entity, comprising: receiving, from a first device, a request for an out-of-band (OOB) key associated with a ranging session at the first device; and transmitting the OOB key to the first device OOB upon a successful attestation of the first device with the network entity.

Aspect 20: The method of Aspect 19, wherein the successful attestation of the first device and transmission of the OOB key are associated with a root of trust of the network entity.

Aspect 21: The method of any of Aspects 19-20, wherein transmitting the OOB key includes transmitting the OOB key on a secure provisioning channel.

Aspect 22: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-21.

Aspect 23: An apparatus for wireless communication at a device, the apparatus comprising one or more memories and one or more processors coupled to the one or more memories, the one or more processors configured to cause the device to perform the method of one or more of Aspects 1-21.

Aspect 24: An apparatus for wireless communication, the apparatus comprising at least one means for performing the method of one or more of Aspects 1-21.

Aspect 25: A non-transitory computer-readable medium storing code for wireless communication, the code comprising instructions executable by one or more processors to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

Aspect 27: A device for wireless communication, the device comprising a processing system that includes one or more processors and one or more memories coupled with the one or more processors, the processing system configured to cause the device to perform the method of one or more of Aspects 1-21.

Aspect 28: An apparatus for wireless communication at a device, the apparatus comprising one or more memories and one or more processors coupled to the one or more memories, the one or more processors individually or collectively configured to cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a first device, comprising:
    one or more memories; and
    one or more processors, coupled to the one or more memories, individually or collectively configured to cause the first device to:
        obtain an out-of-band (OOB) key that is shared OOB with respect to a ranging session defined in-band between the first device and a second device;
        generate, during the ranging session using the OOB key itself or in combination with information used in-band, one or more first inputs to a first scrambling sequence used in the ranging session, wherein to generate the one or more first inputs, the one or more processors are configured to cause the first device to generate an OOB initialization vector (IV); and
        transmit a first message to the second device during the ranging session using the first scrambling sequence.

2. The apparatus of claim 1, wherein to obtain the OOB key, the one or more processors are individually or collectively configured to cause the first device to receive the OOB key from a network entity or a peer device.

3. The apparatus of claim 1, wherein the one or more processors are individually or collectively configured to cause the first device to transmit the OOB key to a second device OOB.

4. The apparatus of claim 1, wherein to obtain the OOB key, the one or more processors are individually or collectively configured to cause the first device to receive the OOB key from a network entity OOB using a communication technology that is different than a communication technology that is used in-band during the ranging session.

5. The apparatus of claim 1, wherein to obtain the OOB key, the one or more processors are individually or collectively configured to cause the first device to receive the OOB key from a network entity on a secure provisioning channel.

6. The apparatus of claim 5, wherein the secure provisioning channel is terminated by a root of trust of the first device that is associated with key management or terminated by a secure element of the first device having a high security assurance level.

7. The apparatus of claim 1, wherein the one or more processors are individually or collectively configured to cause the first device to securely store the OOB key at the first device prior to starting the ranging session.

8. The apparatus of claim 7, wherein to securely store the OOB key, the one or more processors are individually or collectively configured to cause the first device to store the OOB key at a root of trust of the first device or in a secure element of the first device.

9. The apparatus of claim 1, wherein the ranging session is associated with a short-range wireless protocol, and wherein the first device is a central device and the second device is a peripheral device.

10. The apparatus of claim 1, wherein the ranging session is associated with a short-range wireless protocol, and wherein the first device is a user equipment (UE) and the second device is associated with a locking mechanism.

11. The apparatus of claim 1, wherein the information used in-band includes a set of derivation diversifiers, and wherein to generate the one or more first inputs, the one or more processors are individually or collectively configured to cause the first device to generate the one or more first inputs using the OOB key and the set of derivation diversifiers.

12. The apparatus of claim 11, wherein the set of derivation diversifiers is associated with a long term key and includes an initialization vector, an initialization nonce, and a personalization vector.

13. The apparatus of claim 11, wherein the one or more processors, to cause the first device to generate the one or more first inputs to the first scrambling sequence, are configured to cause the first device to generate, for a first ranging iteration of the ranging session with the second device, a first key and a first nonce using the OOB IV and the set of derivation diversifiers.

14. The apparatus of claim 13, wherein the one or more processors are individually or collectively configured to cause the first device to:

generate, for a second ranging iteration, a second key and a second nonce as second inputs to a second scrambling sequence; and transmit, to the second device as part of the second ranging iteration, a second message using the second scrambling sequence.

15. An apparatus for wireless communication at a second device, comprising:

one or more memories; and one or more processors, coupled to the one or more memories, individually or collectively configured to cause the second device to:

receive, from a first device or a network entity, an out-of-band (OOB) key that is shared OOB with respect to a ranging session defined in-band between a first device and the second device;

generate, in-band using the OOB key itself or in combination with information used in-band, one or more inputs to a first scrambling sequence used in the ranging session, wherein to generate the one or more inputs, the one or more processors are configured to cause the second device to generate an OOB initialization vector (IV); and receive a first message from the first device that uses the first scrambling sequence.

16. The apparatus of claim 15, wherein the one or more processors are individually or collectively configured to cause the second device to decode the first message using the first scrambling sequence.

17. The apparatus of claim 15, wherein the one or more processors are individually or collectively configured to cause the second device to securely store the OOB key at the second device prior to starting the ranging session.

18. An apparatus for wireless communication at a network entity, comprising:

one or more memories; and one or more processors, coupled to the one or more memories, individually or collectively configured to cause the network entity to:

receive, from a first device, a request for an out-of-band (OOB) key associated with a ranging session at the first device; and transmit the OOB key to the first device OOB upon a successful attestation of the first device with the network entity, wherein the OOB key, in combination with information used in-band, is used to generate OOB initialization vector (IV) for one or more first inputs to a first scrambling sequence used in the ranging session.

19. The apparatus of claim 18, wherein to transmit the OOB key, the one or more processors are configured to cause the network entity to transmit the OOB key on a secure provisioning channel.

20. The apparatus of claim 18, wherein the information used in-band includes a set of derivation diversifiers, wherein the set of derivation diversifiers is associated with a long term key and includes an initialization vector, an initialization nonce, and a personalization vector.

* * * * *